United States Patent
Guerra

(10) Patent No.: US 10,455,276 B2
(45) Date of Patent: Oct. 22, 2019

(54) METHODS AND APPARATUS FOR CONTROLLING UNAUTHORIZED STREAMING OF CONTENT

(71) Applicant: Justin R. Guerra, Louisville, CO (US)

(72) Inventor: Justin R. Guerra, Louisville, CO (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 566 days.

(21) Appl. No.: 13/784,335

(22) Filed: Mar. 4, 2013

(65) Prior Publication Data

US 2014/0250471 A1 Sep. 4, 2014

(51) Int. Cl.
*H04N 21/436* (2011.01)
*H04N 21/472* (2011.01)
*H04N 21/64* (2011.01)
*H04N 21/658* (2011.01)

(52) U.S. Cl.
CPC . *H04N 21/43615* (2013.01); *H04N 21/47202* (2013.01); *H04N 21/64* (2013.01); *H04N 21/6581* (2013.01)

(58) Field of Classification Search
CPC ........... H04N 21/4823; H04N 21/2225; H04N 21/25816; H04N 21/25875; H04N 21/274; H04N 21/2747; H04N 21/43615; H04N 21/47202; H04N 21/64; H04N 21/64707; H04N 21/64715; H04N 21/6581
USPC .............................................. 725/89, 23, 31
See application file for complete search history.

(56) References Cited

U.S. PATENT DOCUMENTS

| | | | | |
|---|---|---|---|---|
| 7,080,400 B1* | 7/2006 | Navar | ............... | H04N 7/17336 348/E7.073 |
| 2001/0054112 A1* | 12/2001 | Nobakht | ........... | G06F 17/30884 709/245 |
| 2002/0039907 A1* | 4/2002 | McKenna | ............. | H04W 40/02 455/517 |
| 2002/0174430 A1* | 11/2002 | Ellis | .................. | H04N 5/44543 725/46 |
| 2003/0149988 A1* | 8/2003 | Ellis | .................. | H04N 5/44543 725/87 |
| 2003/0204856 A1* | 10/2003 | Buxton | .............. | H04N 7/17318 725/120 |
| 2004/0246376 A1* | 12/2004 | Sekiguchi | .......... | H04N 7/17318 348/468 |

(Continued)

*Primary Examiner* — An Son P Huynh
(74) *Attorney, Agent, or Firm* — Straub & Straub; Michael P. Straub; Stephen T. Straub

(57) ABSTRACT

The present invention relates to methods and apparatus relating to content streaming, e.g., in a home network, in a manner that reduces the chance of streaming of content to a device which is not authorized to receive the content. In an exemplary method of controlling content streaming on a home network in accordance with one embodiment of the present invention, the method involves receiving at a home network gateway a first video on demand service request message from a first device coupled to the home network, storing a portion of said first video on demand service request message in memory, receiving at said home network gateway a second message, and determining based on a portion of said second message and a portion of said stored first video on demand service request message whether to provide the requested video on demand service.

20 Claims, 10 Drawing Sheets

(56) References Cited

U.S. PATENT DOCUMENTS

| | | | |
|---|---|---|---|
| 2004/0261093 A1* | 12/2004 | Rebaud | G06F 21/10 725/25 |
| 2005/0028208 A1* | 2/2005 | Ellis | H04N 7/163 725/58 |
| 2005/0033850 A1* | 2/2005 | Kirkland | H04L 29/06027 709/228 |
| 2005/0039213 A1* | 2/2005 | Matarese | H04N 7/17336 725/95 |
| 2006/0143692 A1* | 6/2006 | Kodama | H04L 12/4604 726/3 |
| 2007/0157281 A1* | 7/2007 | Ellis | H04N 7/17309 725/134 |
| 2008/0117922 A1* | 5/2008 | Cockrell | H04L 12/66 370/401 |
| 2009/0063994 A1* | 3/2009 | Pickelsimer | G06F 17/30017 715/753 |
| 2010/0058405 A1* | 3/2010 | Ramakrishnan | H04N 7/17318 725/97 |
| 2010/0115565 A1* | 5/2010 | Fujihira | H04N 7/17318 725/91 |
| 2010/0153885 A1* | 6/2010 | Yates | G06F 3/0482 715/841 |
| 2010/0239086 A1* | 9/2010 | Johnston | H04L 9/083 380/43 |
| 2010/0330957 A1* | 12/2010 | Harada | H04M 15/00 455/406 |
| 2011/0078717 A1* | 3/2011 | Drummond | H04N 21/4586 725/14 |
| 2011/0093883 A1* | 4/2011 | Sun | 725/31 |
| 2012/0023535 A1* | 1/2012 | Brooks | 725/110 |
| 2012/0151042 A1* | 6/2012 | Garg et al. | 709/224 |
| 2013/0111516 A1* | 5/2013 | Son | H04N 21/41407 725/25 |
| 2013/0174191 A1* | 7/2013 | Thompson et al. | 725/23 |
| 2013/0198796 A1* | 8/2013 | Brooks | H04L 12/2898 725/129 |
| 2014/0157300 A1* | 6/2014 | Childs | H04N 21/2396 725/25 |
| 2014/0165121 A1* | 6/2014 | Dang | H04L 65/4084 725/109 |
| 2014/0181933 A1* | 6/2014 | Sanjeev | H04L 63/0823 726/7 |

* cited by examiner

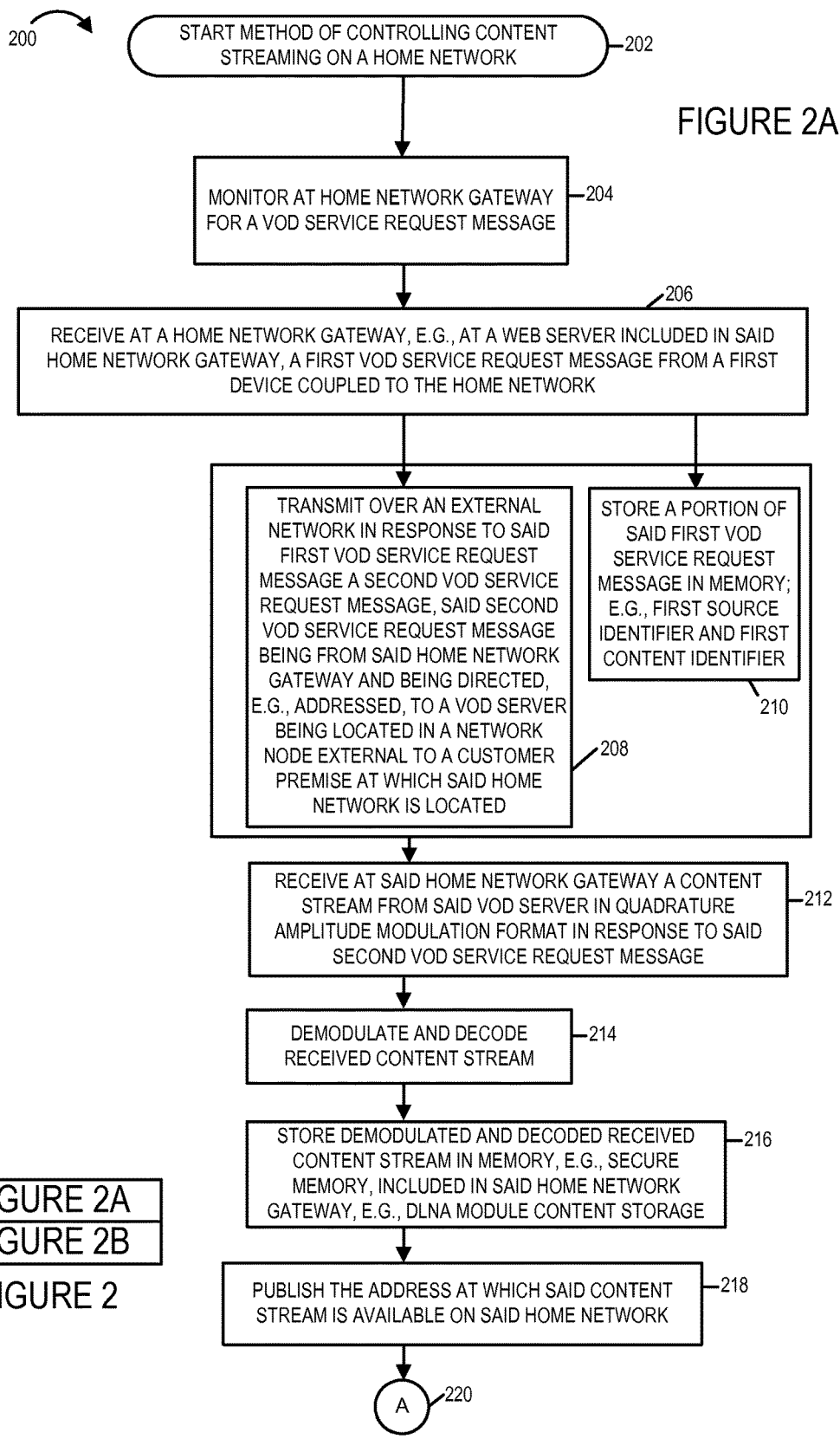

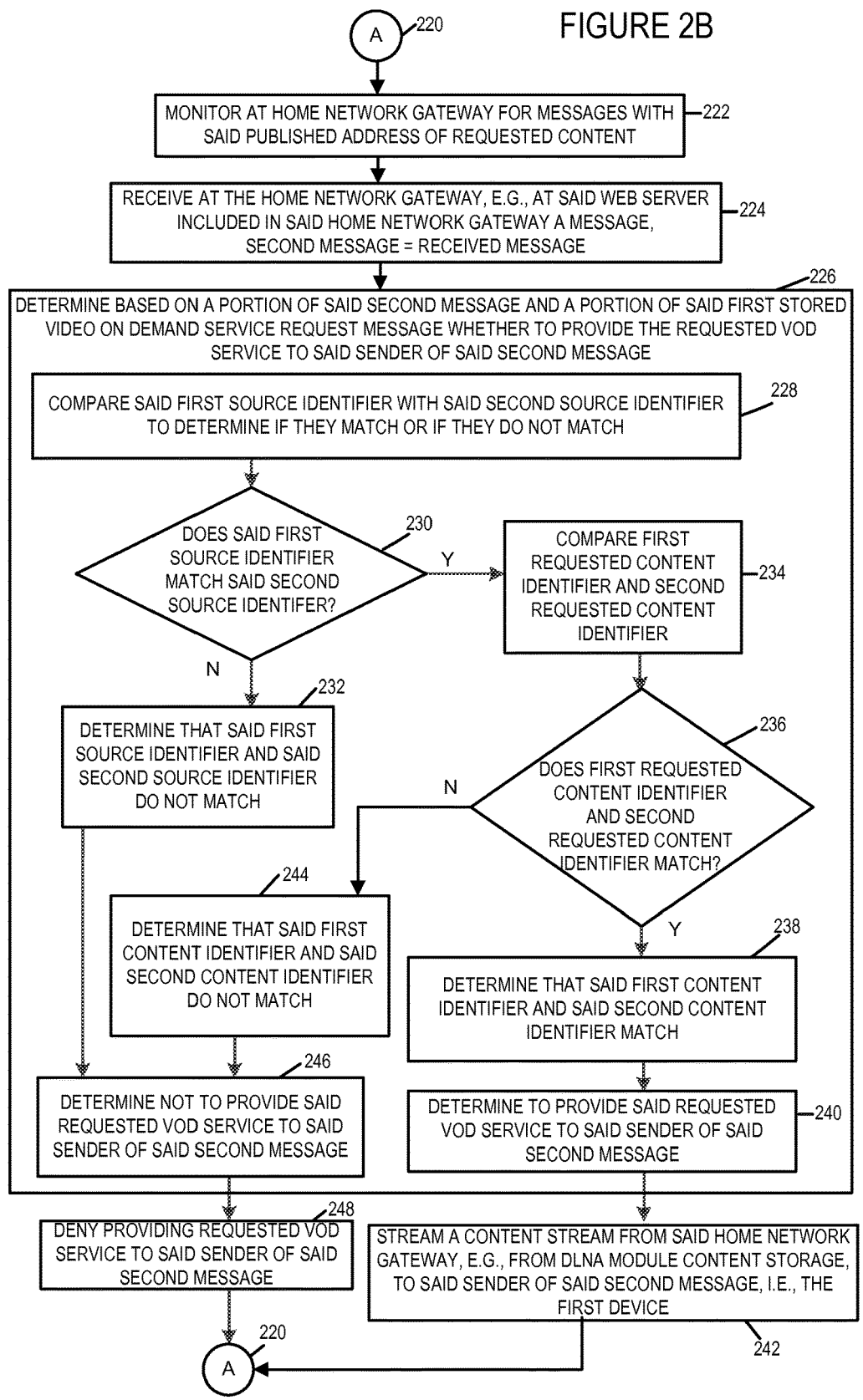

| REQUEST NO. | SOURCE IDENTIFIER | CONTENT IDENTIFIER | TUNING INFORMATION | DLNA PUBLISHED CONTENT ADDRESS, E.G., URL |
|---|---|---|---|---|
| 1 | ADDRESS OF CPE X 118 | MOVIE: CASABLANCA | | |
| | | | | |
| | | | | |
| | | | | |

FIGURE 6A

METHODS AND APPARATUS FOR CONTROLLING UNAUTHORIZED STREAMING OF CONTENT

FIELD

The present invention relates to methods and apparatus relating to content delivery, e.g. streaming of on demand or pay per view content, to devices which are part of a home network, in a manner that does not require the end device receiving the content to include a QAM tuner and demodulator and which allows for limits on which device or devices are supplied with content in response to a content request.

BACKGROUND

The use of IP (Internet Protocol) devices on home networks such as those now commonly found in many customer premises, e.g., homes, offices, etc., is now relatively common place. While IP content delivery is growing in importance, older systems such as cable network content delivery systems often rely on delivery of content via one or more channels corresponding to particular frequencies, with the content being communicated over the channel using QAM (Quadrature Amplitude Modulation). Such channels are sometimes referred to as QAM channels since they are dedicated to content delivery via QAM modulation. In order to recover data communicated over a QAM channel, the QAM channel is tuned to and the data, e.g., VOD (Video On Demand) content or broadcast program data, is recovered by demodulating and decoding the communicated content stream, e.g., an MPEG 2 video stream or other content stream. While the content stream may be encoded digital video, to recover the QAM channels a device requires a tuner with a QAM demodulator which is normally lacking in many IP devices.

Accordingly, IP devices coupled to a home network often can not directly access or obtain content from QAM channels due to the lack of a QAM tuner and/or direct access to a QAM channel of the content delivery network which supplies content to a customer premise, e.g., residence. Thus, while IP devices such as IP TVs and IP playback devices can playback content streamed via an IP packet steam, e.g., a unicast packet stream to the end device, they are often unable to take advantage of the existing QAM content delivery channels which are often available for providing VOD and/or other content on demand because of the lack of suitable tuner/demodulator hardware.

While the inability to directly stream content to IP devices over existing QAM channels limits the utility of such QAM channels with regard to IP devices, security concerns with regard to devices on a home network present another set of challenges to on demand service providers.

In order to provide some level of security in home networks, e.g., for IP based content delivery, various companies have formed an alliance referred to as the Digital Living Network Alliance sometimes referred to as DLNA. DLNA devices are devices which implement security operations in accordance with DLNA requirements set by the Digital Living Network Alliance. DLNA devices are required to be secure with respect to the content they process with content being transmitted from and between such devices in a secure manner, e.g., in encrypted form.

While DLNA provides some protection against non-DLNA devices being able to receive and/or use content being communicated by a DLNA device, the DLNA standard is designed with transparency in mind Any content published by a DLNA compliant device to a local network is normally accessible by any other DLNA compliant device on the local network.

While this may ensure that only DLNA compliant devices can use content published on a local network by another DLNA compliant device, it does nothing to limit content viewing to a single DLNA device, e.g., a single end consumer device of content being supplied, which is often desirable in the case of video on demand and/or other pay per view services where a customer often pays to have the content supplied to a particular device without the right to display the content on all the devices that may be located on a home network.

In view of the above discussion, it should be appreciated that there is a need for methods and apparatus which would allow QAM content delivery channels to be used to provide content to IP based devices, e.g, IP devices lacking a QAM tuner and demodulator, on a home network. It should also be appreciated that there is a need for limiting which devices on the home network are supplied with content in response to a video on demand and/or a pay per view content request.

SUMMARY

Methods and apparatus are described which allow for QAM channel based and/or other channel based content delivery systems to be used to supply content to IP devices, e.g., devices on a home or other customer premise located network, which lack a tuner capable of tuning to a content delivery channel are described.

In accordance with various embodiments a gateway device is positioned between the channel based content delivery network and the network at the customer premise location, e.g., home network. The home network may be an Ethernet or other network capable of supporting the communication of IP packets to IP devices which can act as consumers of content, e.g., which can decode and output content to a user. The output of the content may be by displaying the content, e.g., on a display device or by generating audio signals via a speaker which can be heard by the user.

The gateway device may, and in various embodiments does, include a QAM tuner and a demodulator in addition to a decoder for decoding encrypted content communicated over the channel based content delivery network. The gateway device is, in at least some embodiments, a DLNA compliant device capable of making content received and/or stored in the gateway device available to other DLNA compliant devices via the local, e.g., home, network to which the gateway device is coupled. The gateway device may publish, e.g., broadcast, information on the home network allowing other devices to then obtain content corresponding to the publication via the DLNA compliant gateway.

In some embodiments, the DLNA gateway acts as an interface between IP devices on the home network which lack QAM channel tuners and the channel based content delivery network. Via the gateway device an IP device can request content available from the channel based content delivery network which is received, decoded, decrypted (if necessary) and then made available to the device on the local network, e.g., as an IP packet stream. As part of the stream received content the DLNA gateway normally encrypts the content before streaming it to the DLNA device.

Thus, the gateway of the present invention allows IP devices on a home network to obtain content, e.g., pay per view and/or other on-demand content from the channel based content delivery network which they could not directly access and/or present requests to.

The gateway device, in various embodiments acts as a secure bridge allowing content to be supplied via the channel based content delivery network in a secure manner to a requesting device authorized to receive the content. In various embodiments the channel based network, e.g., billing system in the headend office of the cable network supplying content in response to a pay per view or other on-demand request, will track and charge or otherwise bill the end user of the IP device for the requested content.

While use of a DLNA gateway provides a convenient way to bridge the channel based content delivery network and allow for delivery of content via IP streams, e.g., generated by the gateway, the use of DLNA presents certain problems with regard to restricting access to content on the local network to particular local devices, e.g., the device which requested the content and was determined to be authorized to access the content and the user of which will be billed for accessing the content.

Given that the DLNA standard was designed with transparency in mind, any content published to the local network is normally accessible by any other device on the local network. To overcome this deficiency, before content received from the channel based content delivery network is streamed from the gateway in an IP stream to a device, the device must make a request for the content following an initial request which triggered the gateway to request the content from a device in the channel based content delivery network. Information identifying the source, e.g., requesting IP device, which made the initial request for a particular piece of content is stored in the gateway. This information identifying the device sending the initial request for the particular piece of content is compared to information identifying the source of a second request for the particular piece of content, where the second request is a request received at the gateway via the home network which is used to trigger IP streaming of the content to the device sending the second request. The second request normally follows publication of information needed to trigger IP streaming of content which has been or is being received from the channel based content delivery network in response to an earlier request for content. The gateway compares the information identifying the source of the initial request for the particular content to the information identifying the device sending the second request for the particular piece of content and responds by streaming the content, e.g., via an IP unicast stream, if the device identifiers match. If the identifier of the device which sent the initial request does not match the identifier of the device which sent the second request the request for streaming of the particular content is denied.

In the above described manner IP content streaming of content received via a channel based content delivery network can be limited to the initial requesting device rather than any and/or all of the DLNA capable devices on the local network. The device which made the initial request can be checked to make sure it is authorized to receive the requested content by the billing system in the channel based content delivery system before the content is supplied and the gateway device takes the steps necessary to see that the content is supplied to the requesting device corresponding to the account and/or user which will be billed for the content and not other IP devices on the local network to which the gateway is coupled.

Thus, the methods and apparatus of the present invention allow DLNA content delivery techniques to be used while still allowing restrictions on which device or devices on a local network will be able to access content supplied in response to a content request.

Accordingly, non-QAM channel capable devices, like an IP set top box (STB) or other IP devices are able to be provided with VOD content made available to the customer premise via a QAM or other channel based network, and be able to receive the content as a unicast IP stream without imposing the high bandwidth requirements of IP streaming on the channel based content delivery network. This approach allows content delivery systems to exploit the efficiency of the QAM channels for video delivery to a house while supporting the use and convenience of HTTP/IP video delivery within the house while still being able to restrict which devices in the house receive the supplied content.

While various exemplary embodiments and features have been described, numerous additional features and embodiments are described in the detailed description which follows.

BRIEF DESCRIPTION OF THE FIGURES

FIG. 2A which is a first part of FIG. 2 illustrates a first portion of an exemplary method for controlling unauthorized streaming of content.

FIG. 2B which is a second part of FIG. 2 illustrates a second portion of an exemplary method for controlling unauthorized streaming of content.

FIG. 6A illustrates an exemplary table of service requests and associated information stored in memory an used in accordance with one embodiment of the present invention.

DETAILED DESCRIPTION

Figure 1:
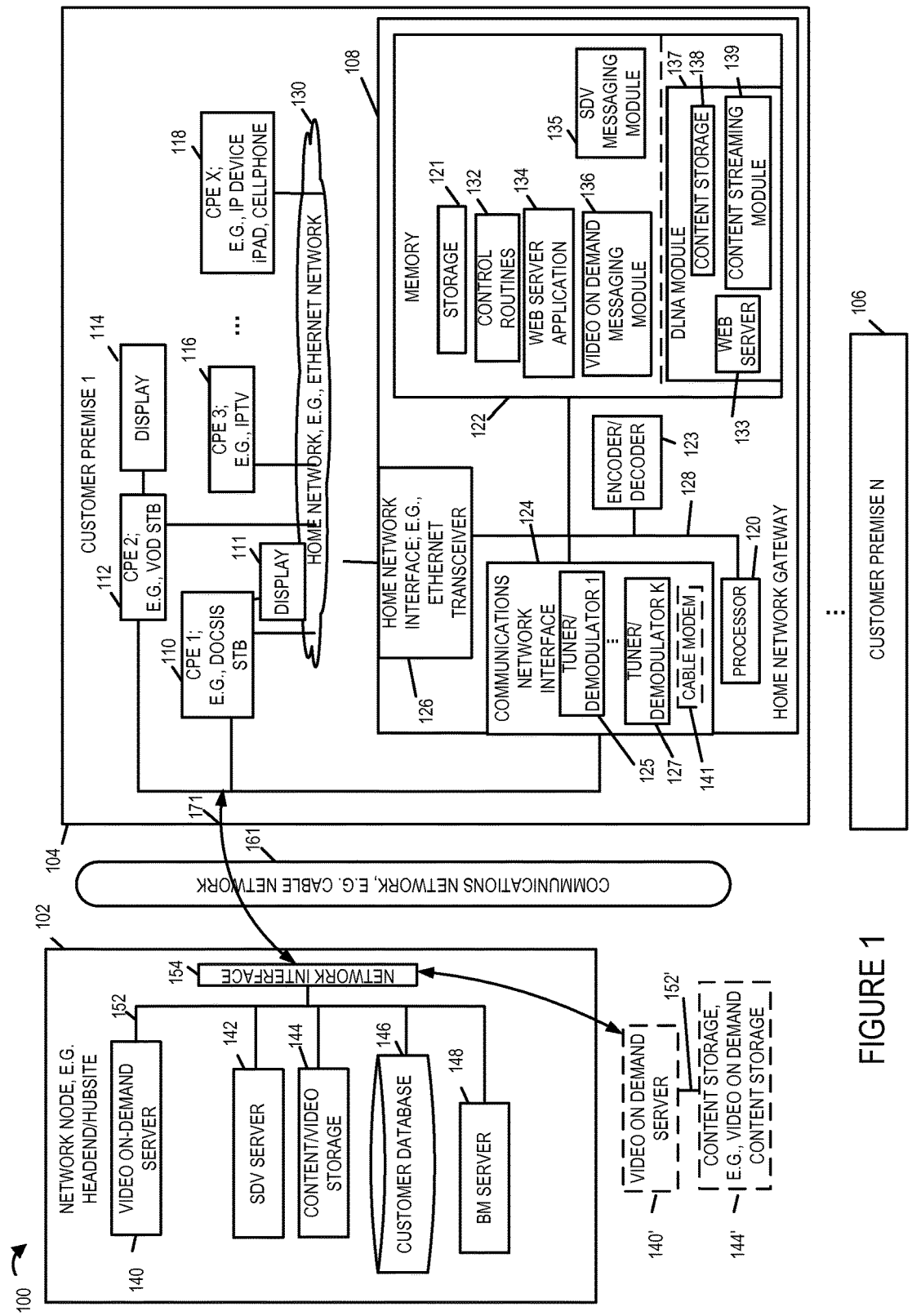
FIG. 1 illustrates an exemplary system implemented in accordance with some embodiments of the present invention.

FIG. 1 illustrates an exemplary system 100 implemented in accordance with one exemplary embodiment of the present invention. The system 100 supports delivery of content such as video on demand, pay per view or switched digital video content to customer premise equipment (CPEs), e.g., set top boxes, internet protocol capable TVs, computers, tablets, mobile phones, etc., via a home network gateway 104 in accordance with some embodiments of the present invention. The system 100 includes a network node 102, e.g., a headend/hubsite, a communications network 161, e.g., a cable network such as a hybrid fiber-coaxial (HFC) network, and a plurality of exemplary customer premises shown as customer premise 1 104 . . . customer premise N 106. In various embodiments video on demand including the streaming of content, e.g., multimedia content such as video on demand, is delivered from the headend 102 over the cable network 161 to one or more CPEs in the customer premises 104, 106. As will be discussed some of the CPE devices at the customer premises are coupled to a home network gateway 108 via a home network 130, e.g., a Ethernet Network. In accordance with the features of various embodiments the CPE devices coupled to the home network 130 may, and in various embodiments do, obtain video on demand services with the assistance of an exemplary home network gateway device 108.

The network node 102 which may, and in some embodiments is, a headend and/or hubsite may be implemented at a cable network office or hubsite serving a plurality of customer premises and includes multiple servers and databases which are coupled together as shown. The network node 102 may be referred to herein as a headend/hubsite for exemplary purposes. In the FIG. 1 example, the headend/hubsite 102 includes a video on-demand (VOD) server 140, a switched digital video (SDV) content server 142, a content/video storage 144 which may include a secure storage device, a customer database 146 and a business management server 148. It should be appreciated that various servers and/or elements shown to be included in the headend 102 may reside outside the headend 102 in some embodiments and may be located anywhere in the system 100, e.g., in a distributed manner. By way of further example, video on demand server 140 and content/video storage 144 may be located outside of headend 102 shown as optional video on demand server 140' and content storage 144'. The video on demand content storage 144' is coupled to video on demand server 140' by communication link 152' but is still managed by network interface 154. In the FIG. 1 example, various servers and other elements included in the headend/hubsite 102 are coupled together by a local network 152. The local network 152 is coupled via one or more network interfaces 154 to other networks and/or devices. For example, the headend/hubsite 102 is coupled via network interface 154 to communications network 161, e.g., a cable network, and may also be coupled to one or more other external networks. In some embodiments system 100 may also include one or more mobile network(s) including one or more base stations (BS) for supporting communications, e.g., delivery of content and/or other signaling, with mobile devices such as cell phones.

Via the cable network 161, the elements shown in the network headend/hubsite 102 can send and/or exchange various information with the devices located at the customer premises 104, . . . , 106. As shown in FIG. 1, communications link 171 traversing the cable network 161 couples the home network gateway 108 and CPEs 110 and 112 to the various elements/servers shown in the network headend 102 and to the optional video on demand server 140'.

The video server 140 is responsible for delivering video on demand services e.g., programming content, e.g., on-demand movies, sporting events, etc. and/or other information to one or more devices at the customer premises 104, . . . , 106, in response to video on demand service requests. The switched digital video (SDV) content server 142 provides digital programming content to one or more devices which support receiving SDV content. In various embodiments the content servers 140, 142 access the programming content from the content storage 144 and generate transport streams suitable for delivery to the home network gateway 108 and/or various CPEs via the communications network 161. The content storage 144 stores content, e.g., audio, video and/or other multimedia content. In some embodiments the content stream is encrypted prior to delivery to the devices at the customer premises over the communications network 161.

The customer database 146 includes, for a plurality of customers, customer information, account information and information regarding the devices installed at customer premises. In some embodiments customer account information includes, e.g., customer account number, customer subscription/service information, customer device capability and other billing related information. Customer database 146 also includes customer device information, e.g., identification and/or other information regarding customer devices such as home network gateways, STBs, cable modems, etc., installed at various customer premises served by the headend/hubsite 102.

BM (Business Management) server 148 sometimes referred to as the billing server processes billing information corresponding to customers serviced by the headend 102. This may include updating billing charge information in response to changes in services being provided to the customer, upgrades, on-demand content purchases, and/or other activity. Business management server 148 also processes service bill payment information, e.g., bill payment transactions, deductions from debit accounts, mail bills, and/or processes discount and/or other information.

Each customer premise 104, 106 may include a plurality of CPEs, e.g., devices including content playback devices. In various embodiments the CPEs located at the customer premises include, e.g., gateways, modems, routers, and content playback devices including, e.g., set top box, internet protocol devices, internet protocol capable TVs, personal computers, mobile devices such as laptops, tablet devices such as iPads, smart phones such as iPhones, etc. In various embodiments a device presents the program content to a viewer, e.g., a customer/subscriber. In the FIG. 1 exemplary embodiment, customer premise 1 104 includes a CPE 1 110, e.g., a DOCSIS (Data Over Cable Service Interface Specification) set top box, coupled to display device 111, a CPE 2, e.g., STB 112, e.g., a video on demand capable set top box, coupled to a display device 114, a CPE 3, e.g., internet protocol capable television (IPTV) 116, . . . , CPE X 118, e.g., an internet protocol capable device (IP device), e.g., an iPad, cell phone, etc., and a home network gateway 108. Exemplary CPE devices, CPE 1 110, CPE 2 112, CPE 3 116, . . . , CPE X 118 and home network gateway device 108 are coupled to a home network 130, e.g., a local area network such as an Ethernet network, over which they communicate and exchange information. The home network may be any of a variety of known network types and configurations including being a wired network, a wireless network and/or supporting a combination of wired and wireless network devices. The display devices may be and in some embodiments are, e.g., standard televisions, high definition televisions, and monitors. It should be appreciated that in some embodiments content playback devices can be integrated in a device which also includes a display. In some embodiments the CPE 1 110 is a DOCSIS 3.0 set top box. Video on demand capable set top box devices, e.g., CPE 2 STB 112, support receiving video on demand service, e.g., programming content from the headend/hubsite 102 over the communications network 161. The CPE 3 116 is an internet protocol capable TV (IPTV). The CPE X IP capable device 118, could be any of a variety of devices that support communications over IP, e.g., IP STBs, cell phones such as an iPhone, tablet devices such as iPads, laptops, computers, mobile IP devices, etc. In at least some embodiments, the devices at the customer premise 1 104, e.g., CPE 3 116 and CPE X IP device 118, do not include an interface for coupling to the communication link 171 and instead communicate with the headend via the home network gateway 108. In most embodiments, the home network gateway 108 and CPE devices support DLNA and/or are DLNA compliant devices.

In some embodiments the exemplary home network gateway device 108 includes a processor 120, a memory 122, a communications network interface 124 for communicating and exchanging information over the communication network 161, an encoder/decoder 123 for encoding/decoding messages and/or content and a home network interface 126, e.g., an Ethernet transceiver in at least some embodiments in which the home network is an Ethernet network, coupled together by a bus 128. The communications network interface 124 in some embodiments includes one or more tuners and demodulator pairs tuner/demodulator 1 125 through tuner/demodulator K 127 which can be used to receive video and/or data content. In some embodiments the home network gateway 108 includes a cable modem 141 for communicating with headend 102 and receiving video and/or data content. In at least some embodiments encoder/decoder 123 is included in the communication network interface 124. In some embodiments the encoder/decoder 123 are software routines stored in the control routines 132 of memory 122. Thus it should be appreciated that a variety of implementations are possible and a wide variety of devices e.g., content player devices, can be supported by the home network gateway 108.

In some embodiments the gateway device 108 is a DOCSIS 3.0 compatible gateway device which includes a DSG (DOCSIS Set-top Gateway) agent and which serves as a CMTS (cable modem termination system). While shown in the customer premise the home network gateway 108 may, and in some embodiments is, located outside the customer premise, e.g., at a hubsite to which the customer premise is located. However, in most embodiments the gateway device 108 is a residential gateway located at the customer premise site, e.g., in the home of user, to which the set top boxes and the other CPE devices serviced by the residential home network gateway 108 correspond. In the residential gateway device, an Ethernet is often used for the home network although coax, wireless and/or other types of home networks and/or network interfaces can be and are supported in some embodiments. In a DOCSIS gateway embodiment, the set top boxes which interact with the gateway include a DSG client which can receive content which is tunneled from the gateway 108 to the DSG client of the set top box, e.g., over an Ethernet, a wireless connection and/or a coax connection to the set top box or other content player device.

The memory 122 includes storage 121, control routines 132, a web server application 134, a SDV messaging module 135, a video on demand messaging module 136 and a digital living network alliance module (DLNA) module 137 including web server 133, content storage 138 and content streaming module 139. The various modules perform various functions in accordance with the invention. The operation of the exemplary home network gateway device 108 and the functions of various modules are discussed later in detail. In accordance with one aspect of some embodiments, when a device such as CPE 1 DOCSIS STB 110, CPE 2 VOD STB 112, CPE 3 IPTV device 116, and/or the CPE X IP device 118 transmits a video on demand service request message to the web server application 134 over the home network 130, it is received via the home network interface 126 and provided to the web server application 134 by the processor 120. The web server application stores a portion of the received video on demand service request message in storage 121 of memory 122 for future use. A portion of a message can include the entire message. After parsing the video on demand service request message and determining the message is a request for a video on demand service the web server communicates with the video on demand messaging module 136 that a request has been received for a video on demand service. The video on demand messaging module is configured to communicate video on demand requests for service to headend 102 and video on demand server 140 therein initiating a video on demand session. The video on demand messaging module 136 having received a request for video on demand service from said web server will generate a video on demand service request message which in this instance shall be referred to as a second video on demand service request message.

This second video on demand service request message is transmitted from the video on demand messaging module 136 to video on demand server 140 in the headend 102 via bus 128, communications network interface 124, communication network 161, and network interface 154. The video on demand server 140 upon receiving the video on demand service request message may, and in some instances does, provide the requested video on demand service, e.g., a video on demand program, by transmitting a content stream containing the video on demand program from content/video storage 144 to the home network gateway 108 via network interface 154, communications network 161 and communications network interface 124.

The transmitted video on demand content stream being streamed in a quadrature amplitude modulation format and being received at a tuner/demodulator, e.g. tuner/demodulator 1 125 of the communications network interface 124 of the home network gateway 108. In at least some embodiments the encoder/decoder 123 operates to decode and decrypt the received content stream. Additionally, the video on demand server will send tuning information to the home network gateway 108 which is used by the home network gateway 108 to configure its tuner/demodulator 1 125 to receive the video on demand content stream being provided by the video on demand server 140. The content stream received by the home network gateway 108 is stored in DLNA content storage 138 the address of which is published by the DLNA module 137 to the web server 134 and devices coupled to the home network 130. Upon the publication of the address by the DLNA module, the web server 134 sends a uniform resource locator to the first device which requested the service. The first device responds by sending a second message using the uniform resource locator provided by the web server 134. The second message being directed to the DLNA web server 133. The DLNA web server 133 upon receiving the second message, e.g., URL message, from the first device requests the web server 134 determine that the first device is indeed the device that previously requested this video on demand content. In at least some embodiments this is accomplished by the DLNA web server 133 requesting the web server 134 resolve the URL request for content/services the DLNA web server 133 received as the second message by providing the tuning information associated with the content. If the web server 134 determines that the second message originated from the first device resolves the URL request and therein initiates the DLNA content streaming module 139 to initiate streaming of the requested content to the first device. If the DLNA web server 133 receives requests from devices on the home network who are not authorized to receive the video on demand content the web server 134 will deny the request for service. For example, in at least some embodiments the web server 134 will not resolve the URL request from the DLNA web server 133 and the DLNA server 133 will then deny, e.g., not provide, the requested content/service. In this way the home network gateway 108 uses resolution of web service requests for access to the published DLNA content addresses to police which devices are allowed to obtain access to DLNA content and therein control streaming of DLNA content to unauthorized devices.

Figure 5:
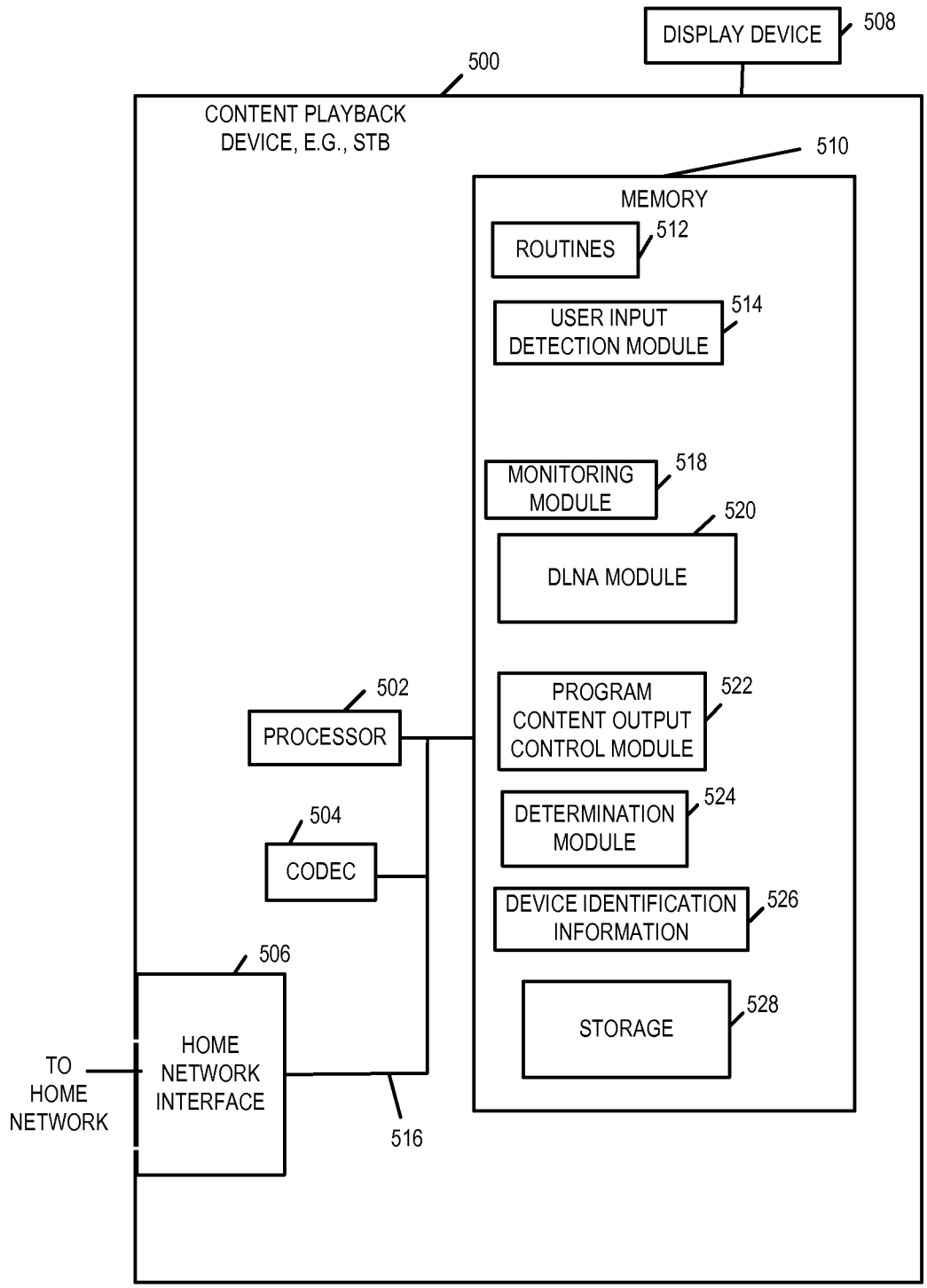
FIG. 5 illustrates some details of exemplary customer premise equipment in accordance with one embodiment of the present invention.

FIG. 5 shows some of the details of an exemplary customer premise equipment in accordance with one embodiment of the present invention for requesting, receiving and displaying content streams such as video on demand content streams. The customer premise equipment includes a content playback device 500, e.g., a set top box, coupled to a display device 508 which may be for example a standard or high definition television or a monitor. The content playback device 500 includes a processor 502, a codec 504, a home network interface 506, a communication link 516, e.g., a bus, a memory 510. The memory 510 includes routines 512, user input detection module 514, monitoring module 518, a DLNA module 520, a program content output control module 522, a determination module 524, and device identification information 526. The communication link 516 allows the communication and exchange of information between and among the processor 502, the codec 504, the home network interface 506 and the memory 510 which are coupled to the communication link 516.

The processor 502 is used to execute the instructions, e.g., programming instructions, stored in memory to operate the content playback device 500. The routines 512 which are stored in memory 510 contain program instructions that are executed on processor 502 to operate the content playback device 500 and perform various functions in accordance with the present invention. The user input detection module 514 contains programming instructions to operate the content playback device to detect user inputs such as signals from remote controllers, buttons and voice commands. The monitoring module 518 includes programming instructions to monitor for inputs from users and messages from other devices that are received on the home network interface 506 such as for example messages from the home network gateway 108, the web server 134 of the home network gateway 108, the DLNA web server 133, and/or DLNA module 137. The DLNA module contains programming instructions that enable the content playback device 500 to be DLNA client. The program content output control module 522 contains programming instructions that are used to control the output of received and/or stored content to the display device 508. The device identification information contains information such as a unique identifier for the device. The device identifier may be the address of the device on the home network for example an IP address if the home network is an IP network. The device identification information may be, and in some embodiments is, a MAC address for the device. In some embodiments, the device identifier is a global unique identifier that corresponds to the device's home network address or MAC address. In some embodiments, the device identifier is a unique identification number assigned by the home network administer such that the number is not used by a device identifier by any other device on the home network. The storage 528 is memory space that may be and sometimes does include secure memory in which content, messaging and other information may be stored. The determination module 524 is used for determining various actions including for example whether to send a video on demand service request message in response to a user input detected by the user input detection module 514.

The home network interface 506 includes a receiver and a transmitter and provides an interface to the home network. The codec 504 is a coder/decoder that can be and is used for encoding messages to be transmitted and decoding received messages which are encoded. In some embodiments the encoder/decoder also performs the function of decrypting received information that is encrypted. The DLNA module 520 performs DLNA related decryptions.

Having generally discussed the exemplary system shown in FIG. 1, an exemplary method will now be discussed in detail with regard to the example shown in FIG. 2. FIG. 2 which includes FIGS. 2A and 2B illustrates an exemplary method of controlling content streaming on a home network in accordance with an exemplary embodiment of the present invention. The method 200 of FIG. 2 is an example used to explain various features of the invention. The FIG. 2 example shows the home network gateway 108 monitoring for a first video on demand service request message from a first device coupled to the home network gateway 108 and then for a second message which is received at the home network gateway. It should be appreciated that additional messages may be processed after and/or in parallel to the processing described in connection with the second message.

The processing steps of the exemplary method 200 of FIG. 2 will now be explained in view of system 100 of FIG. 1.

The method 200 of FIG. 2 starts at start step 202 with the steps of the method unless otherwise specified being executed on processor 120 from which processing proceeds to step 204.

In step 204, the home network gateway 108 monitors the home network interface 126 for a video on demand (VOD) service request message. Upon detection of a video on demand service request message processing proceeds from step 204 to step 206.

In step 206, the home network gateway receives a first video on demand service request message from a first device coupled to the home network. In this example the first device is CPE X 118 which is an internet protocol device. The first device may, and in some embodiments does include, a wide variety of devices that are coupled to the home network such as the exemplary devices described in connection with FIG. 1 and CPE 1 110, CPE 2 112, CPE 3 116 and CPE X 118 which include internet protocol devices, IP set-top boxes, VOD STB which have IP capabilities, computers, an internet protocol (IP) television set, a DOCSIS set-top box, mobile devices such as laptops, cell phones, tablets, etc. In the FIG. 2 example the home network is an internet protocol Ethernet local area network. However, any number of other networks may be used. If other network types are used for the home network each device on the home network must include an interface capable of supporting the type of home network utilized.

The first video on demand service request message may be, and in some embodiments is generated by a first device such as an IP set-top box in response to a program selection signal received at the first device. For example, a user may be viewing a programming listing of video on demand services for example, movies on demand, sporting events on demand, gaming events on demand, etc. The user may, and in some embodiments does, select a video on demand service from the programming listing by inputting a signal to the first device such as through a remote control button push, a voice activated command, a mouse, touch screen selection or other input means. In some embodiments, input of the signal may be via a speech activated interface on the device such as speech recognition module. Upon detection of the user input video on demand program selection signal by the first device, the first device generates a video on demand request signal which will be referred to hereinafter as the first video on demand request signal for purposes of explaining the exemplary method shown in FIG. 2. The first video on demand service request message includes a first source identifier which identifies the message as originating from said first device, a first requested content identifier which identifies the video on demand service being requested, and a destination address which is the destination of the first video on demand service request message. In at least some embodiments the first source identifier is a MAC address or an IP address corresponding to said first device. In some embodiments, the first source identifier may be a global unique identifier (GUID). In some such embodiments, the GUID corresponds to an IP address or MAC address corresponding to said first device. In at least some embodiments, the first content identifier is a service name or service ID of the service being requested. The destination address is the home network gateway 108 and in this example is the web server 134 included in the home network gateway. Web server 134 may be, and in the exemplary embodiment is, a web server application running on the processor 120 of home network gateway 108. In other embodiments the web server 134 may be, and is, a separate hardware module executing instructions located in the home network gateway 108. In some embodiments the first video on demand service request message may be, and is, a uniform resource locator message.

Upon generation of the first video on demand service request message by said first device, the first video on demand service request message is transmitted from said first device by its home network interface via said home network 134 to said home network gateway 108.

As previously explained, upon detection of the first video on demand service request message by the home network gateway 108, the message is received by the home network gateway 108 for example at the web server application 134 via the home network interface 126. Typically, the web server application 134 will parse the message. Processing then proceeds to steps 208 and 210 which may be performed in parallel or alternatively sequentially with either step 208 or step 210 occurring first.

In storage step 210, a portion of the first video on demand service request message received from said first device in step 206 is stored in memory, e.g., storage 121 of memory 122 for potential later use such as in additional processing associated with the first device's request for video on demand service. The portion of the first video on demand service request message may, and in some embodiments does, include the entire first video on demand service request message. In the exemplary method 200, the portion of the first video on demand service request message stored in memory includes the first source identifier and the first content identifier. In some embodiments, information derived from the first video on demand request message may be, and is, stored in memory in place of or in addition to a portion of the first video on demand service request message. For example, information identifying said first device based on said first source identifier may be stored in memory as opposed to the first source identifier. Similarly, information identifying said service/content requested by said first video on demand service request message instead of said first content identifier may be stored in memory.

In transmit step 208, the home network gateway 108 transmits over an external network in response to said first video on demand service request message a second video on demand service request message. The second video on demand service request message being from said home network gateway and being directed, e.g. addressed, to a video on demand server being located in a network node external to the customer premise at which the home network in which the home network gateway and first device are located. In some embodiments this transmission is implemented in the following manner. The web server 134 that received the first video on demand service request message from said first device communicates the first video on demand service request to the video on demand (VOD) messaging module 136 of the home network gateway 108.

The video on demand messaging module 136 generates a second video on demand service request message based upon the first video on demand service request message and/or information contained therein such as the first content identifier which identifies the service being requested by the first device. The video on demand messaging module may include in the generated message the customer information regarding the video on demand request which may be derived from the first source identifier or may be, and in some embodiments is, identified based on the customer identifier of the customer premises 104 in which the home gateway network 108 and first device, e.g., CPE X 118, are located. In some embodiments, the video on demand messaging module acts as a proxy for the web server 134 in communicating with the video on demand server 140.

The video on demand messaging module 136 transmits the second video on demand service request message from the home network gateway 108 to the headend 102 to establish a video on demand session in which the requested service will be provided. The second video on demand messaging module including at least an identifier, e.g., a service name, of the service/content being requested by the first device. The second video on demand service request message being transmitted to the video on demand server 140 of the network node/headend 102 by the video on demand messaging module 136 via the communications network interface 124 of the home network gateway 108 over the communication network, e.g., cable network, 161 to the network interface 154 of the headend 102. The video on demand server 140 receives the second video on demand service request message from the network interface 154 of the headend 102 via communication link 152.

In response to the second video on demand request message, the video on demand server 140 establishes or causes a separate session manager to establish a video on demand session on which the requested VOD service may be provided, e.g., a session on which the requested content may be streamed to the home network gateway 108. The video on demand server 140 transmits or causes to be transmitted to the video on demand messaging module 136 of the home network gateway 108 the tuning information, e.g., the tuning triplet, on which the service will be provided. In some embodiments the tuning information includes the channel, frequency, and modulation type, e.g., quadrature amplitude modulation type which is to correspond to the content stream of the requested service. In some embodiments the video on demand server 140 will identify the customer requesting the video on demand service based on information contained in the second video on demand service request message and access the customer database 146 and/or billing server 148 to ensure the customer is authorized to receive said video on demand service and/or update the customer records and billing information associated with providing the requested video on demand service to the customer.

In some embodiments, a separate resource manager, e.g., a session resource manager and/or a video resource manager, located in the network node/headend 102 is used to setup the requested video on demand session and to transmit the tuning information to the video on demand messaging module 136 in the home network gateway 108.

The video on demand messaging module 136 receives the tuning information from video on demand server 140 via the network interface 154 of the network node/headend 102, communication network, e.g., cable network 161, and the communication network interface 124 of the home network gateway 108. In response to receiving the tuning information for the requested service the video on demand messaging module communicates the tuning information to the web server 134 of the home network gateway 108. The web server 134 communicates the tuning information for the requested service to the communication network interface 124 of the home gateway network 108 which tunes one of the tuner/demodulators 125 to 127 in accordance with the tuner information so that the home network gateway 108 is configured to receive the requested content stream/service over the communication network, e.g., cable network 161.

After the video on demand session has been established, the video on demand server causes the requested content/service to be streamed from the content/video storage 144 to the home network gateway 108 via the network interface 154 and communication network, e.g., cable network 161, in the format type and on the channel and frequency identified in the tuning information provided to the video on demand messaging module 136. The content stream may be, and in some embodiments is, transmitted in a quadrature amplitude modulation (QAM) format as part of an MPEG transport stream. In some embodiments, the content being streamed is encrypted prior to being transported. In such cases, the home network gateway 108 and/or the first device will be provided and/or will already have sufficient information to decrypt the encrypted content. In some embodiments, the encoder/decoder 123 decodes and decrypts the received content streams which may be, and in some instances are, MPEG2 streams with encrypted content.

Processing proceeds from steps 208 and 210 to receive step 212. In receive step 212, the video on demand content stream transmitted by the video on demand server 140 in response to the second video on demand service request message is received at the home network gateway 108. In those embodiments, in which the format type specified in the tuning information as quadrature amplitude modulation, the received content stream will be in a quadrature amplitude modulation format. From receive step 212, processing proceeds to step 214.

In step 214, the received content stream is demodulated and decoded as necessary. In some embodiments, step 214 is performed as part of receive step 212. In some embodiments the decoding step of 214 need not be performed by the communication interface 124 but can be performed by another device, e.g., encoder/decoder 123, in the home network gateway 108 or by the first device.

In the exemplary method, the content stream is received and demodulated by tuner/demodulator 1 125 of communication network 124 which may be, and in some embodiments is, a QAM tuner/demodulator. Tuner/demodulator 1 125 having been configured in accordance with the tuning information provided by the web server 134 which it in turn had received from the video on demand server 140 via the video on demand messaging module 136 in response to the second video on demand service request message generated based on the first video on demand service request received from the first device, e.g., CPE X 118.

Processing proceeds from step 214 to step 216. In step 216, the received content having been demodulated and decoded is stored in memory, e.g., secure memory, included in said home network gateway, e.g., in the content storage 138 of DLNA module 137. In some embodiments the received content stream may be, and is stored, in memory after being decrypted if it was encrypted. In some embodiments, the received content stream is stored in memory without being decoded. Processing proceeds from step 216 to step 218.

In step 218, the DLNA module publishes the address at which said stored content stream is available on said home network. The DLNA publishing includes making available and/or communicating the address at which the requested service/content is available to the web server 134. In at least some embodiments this is achieved by communicating the content identifier, e.g., video on demand service name to the web server with a URL associated with requested content/service. In some embodiments, the content identifier will be included in the content stream provided to the home network gateway 108 and will be the same as the first content identifier received as part of the first video on demand service request from the first device. In some embodiments, publication by the DLNA to the web server 134 is achieved by communicating a portion of the tuning information such as the frequency and channel on which the content was received from the DLNA module to the web server 134. Web server 134 then can identify the requested service from the tuning information previously received from the video on demand server 140 in response to the second video on demand service request message. In some embodiments, the web server 134 sends a portion of the received tuning information to the DLNA module 137 and the DLNA module responds with the address, e.g., URL, at which the received content stream associated with the tuning information is stored. In some embodiments, the DLNA module 137 and web server 134 use one of and/or both of the first content identifier and tuning information provided by the video on demand server 140 to correlate the requested content with the address at which the content stream received in accordance with the provided tuning information is available on the home network 130.

The web server 134 upon obtaining the address, e.g., URL, at which the requested content stream is available transmits the requested information to the first device in response to said first video on demand service request transmitted by said first device to said web server 134 The information is transmitted via home network interface 126 over home network 130.

Processing proceeds from step 218 via connection node A 220 to monitoring step 222 shown in FIG. 2B. In step 222, the home network gateway monitors for messages with said published address of the requested content stream. In some embodiments, web server 134 performs this monitoring function by comparing received messages requesting access to the content available published address. Processing proceeds to receive step 224 upon detection of a message with said published address of where the requested video on demand content is available.

In step 224, the home network gateway 108 receives a message containing the address of the requested content from one of the devices, e.g., CPE 1 110, CPE 2 112, CPE 3 116 . . . CPE X 118 coupled to the home network. In some embodiments, the second message is received by the web server 134 over the home network 130 via the home network interface 126 of the home network gateway 108. In some embodiments, the second message is received by the DLNA web server 133 over home network 130 via the home network interface 126 of the home network gateway 108. This message is assigned the name second message in order to explain the example of method 200. In some embodiments, in step 224 the received message is loaded into a variable named second message. In some embodiments the received second message includes a source identifier which identifies the device from which the second message originated and which will be referred to as a second source identifier, a content identifier which identifies the service/content requested, e.g., service name, the address of the content requested for example the published address of content available in the DLNA storage, and the destination address of the second message, for example the home network gateway 108 and in particular the web server 134 or in some embodiments DLNA web server 133. In some embodiments the second message is a URL message. Processing then proceeds to determination step 226.

In some embodiments monitoring step 222 is bypassed and a detection step is implemented after the receiving step 224 in which received messages are parsed by the receiving web server 134 or in some embodiments DLNA web server 133 to determine if the received message is a request for access to the content stream provided in response to the first video on demand service request. If so processing then proceeds to determination step 226.

In determination step 226, the home network gateway 108 determines based on a portion of said second message and a portion of said first stored video on demand service request message whether to provide the requested video on demand service to said sender that is the originator of the second message. If the sender of the second message is determined to be the first device and is requesting the same service previously requested in the first video on demand service request message then the home network gateway 108 will determine to provide the requested service to the sender of the second message, i.e., the first device. However, if the second message is a request from a different device on the home network from the first device, e.g., if the second message is from the CPE 1 110 then the home network gateway 108 will determine to deny to provide to the sender of the second message, CPE 1 110, the requested content/service or access to the requested content. If the second message is a request from the first device but is not a request for the same content previously requested in the first video on demand service request message but is for different content not requested by the first device in said first video on demand service request message but is available in the DLNA content storage 138, the home network gateway 108 will determine that the content stream associated with the different service than originally requested is not to be provided to the first device and the request will be denied. In some embodiments the web server 134 makes the determination as to whether provide the requested video on demand service to the device which originated the second message. In some embodiments in which the second message is received by the DLNA web server 133, the DLNA web server 133 will request that the web server 134 determine if the sender, i.e., the originator, of the second message is authorized to receive the requested service. In determination step 226 when it is determined that said requested video on demand services are not to provided processing proceeds to step 248 while when it is determined that the requested video on demand services are to be provided processing proceeds to step 242.

In some embodiments, determination step 226 includes sub-steps 228, 230, 232, 234, 236, 238, 240, 244, and 246. In one embodiment of the exemplary method 200, these sub-steps are performed by web server 134 on processor 120.

In sub-step 228 the web server 134 retrieves the first source identifier from storage 121 of memory 122 and compares it with the second source identifier of the second message to determine if they match or if they do not match. Processing proceeds from comparison sub-step 228 to decision sub-step 230.

In decision sub-step 230 if said first source identifier does match said second source identifier then processing proceeds to comparison sub-step 234. Otherwise, processing proceeds to determination sub-step 232.

In determination sub-step 232, web server 134 determines that said first source identifier and second source identifier do not match. That is that the second message was not originated by the first device which originated the first video on demand service request message. In other words, the second message was originated by a device coupled to the home network but who is not authorized to receive access to the video on demand service requested by the first device. Processing proceeds from sub-step 232 to sub-step 246 in which the web server 134 determines not to provide said requested video on demand service to said device originating said second message. Processing proceeds to step 248.

In step 248, the home network gateway 108 denies providing said requested video on demand to said originator of said second message.

Returning to comparison sub-step 234. In comparison step 234, the first content identifier is retrieved from storage 121 memory 122 and compared with the second content identifier received in said second message. Processing then proceeds to decision sub-step 236.

In decision sub-step 236 if the first content identifier does match the second content identifier then processing proceeds to determination sub-step 238. Otherwise processing proceeds to determination sub-step 244.

In determination sub-step 244, web server 134 determines that said first content identifier and said second content identifier do not match. In this case, the second message received originated from the first device because the first and second source identifiers match but the first device was requesting access to content different from the content requested in the first video on demand service request message because the second content identifier does not match the first content identifier. The first device is not authorized to view the content associated with the second content identifier even though the content may be available in the DLNA content store and the address published of the content known to the first device. Processing proceeds from sub-step 244 to sub-step 246. In sub-step 246, the web server 134 determines not to provide the video on demand service requested by the second message to the sender, i.e., originator, of the second message which in this case is the first device. Additionally, as the first device is not requesting the service corresponding to the first content identifier it is determined that the content corresponding to the first content identifier will not be streamed to said first device until such time as a second message is received from said first device which seeks access to the video on demand content stream corresponding to the first content identifier. Processing then proceeds to step 248. In step 248, the home network gateway 108 denies providing the requested video on demand content to said sender of said second message.

In determination sub-step 238 it is determined that said first content identifier and said second content identifier match. The first and second message at this point have been verified as requesting access to the same video on demand service and as coming from the same device, i.e., the first device, e.g., CPE X 118. The first device, CPE X 118, sent the first video on demand service request message and is authorized to view the requested content stream associated with the first content identifier. Processing proceeds from sub-step 238 to determination sub-step 240.

In determination sub-step 240, the web server 134 determines to provide said requested video on demand service/content, e.g., a requested movie on demand, to said first device which is the sender of the said second message. The web server 134 then sends an initiate streaming of requested content message and/or signal to the content streaming module 139 of the DLNA module 137. In some embodiments in which the DLNA web server 133 requested the web server 134 to determine if the requested content should be streamed to said sender of the second message, the web server 134 upon determining to provide said video on demand service/content to said sender of said second message (i.e., the first device) provides the DLNA module with the tuning information for said requested content/service which heretofore had not been provided therein allowing said DLNA web server 133 to resolve said second message URL request.

Processing proceeds to step 242. In step 242 home network gateway 108 streams the content stream corresponding to the first content identifier to said first device. In some embodiments, DLNA streaming module 139 streams the requested content stream from DLNA content storage module 138 via home network interface 126 onto the home network 130 to the first device, e.g., CPE X 118 where it is displayed to the user on a display screen incorporated into or coupled to the first device, e.g., CPE X 118.

In some embodiments, once the requested content is streamed to the CPE X 118 by the DLNA content streaming module 139, trick modes e.g., fast forward/rewind/pause, etc., are all handled by home network gateway 108 as the content stream is stored in the DLNA content storage 138. In at least some other embodiments in accordance with the present, user requests for forward/rewind/pause etc. are forwarded by the video on demand messaging module 136 from the home network gateway 108 to the video on demand server 140 in the network node/headend 102 where the appropriate action is taken in response to the user requests for forward/rewind/pause etc. by the video on demand server 140 in connection with the video on demand content being streamed to the home network gateway 108 and then supplied to the requesting CPE device on the home network.

In some embodiments sub-steps 234, 236, 238, and 240 are bypassed and when said first source identifier and said second source identifier do match processing proceeds from decision sub-step 230 to step 244. In such embodiments, the additional sub-steps are not performed but the determination of whether to stream the requested content is made based on the prior determination that the originating device of the second message was the same as the originating device of the first video on demand service request and the address of the content being requested matches the address published by the DLNA module in association with the content received in response to the first video on demand service request.

Processing proceeds from step 242 and step 248 via connection node A 220 to processing step 222 where monitoring for additional messages continues. Processing of additional messages continues as previously described. As noted in connection with some embodiments of the present invention in step 224 as each new message is received it is loaded into a variable named second message. As such the processing in the subsequent steps pertains to the processing of the most recently received message in step 224.

Figure 3:
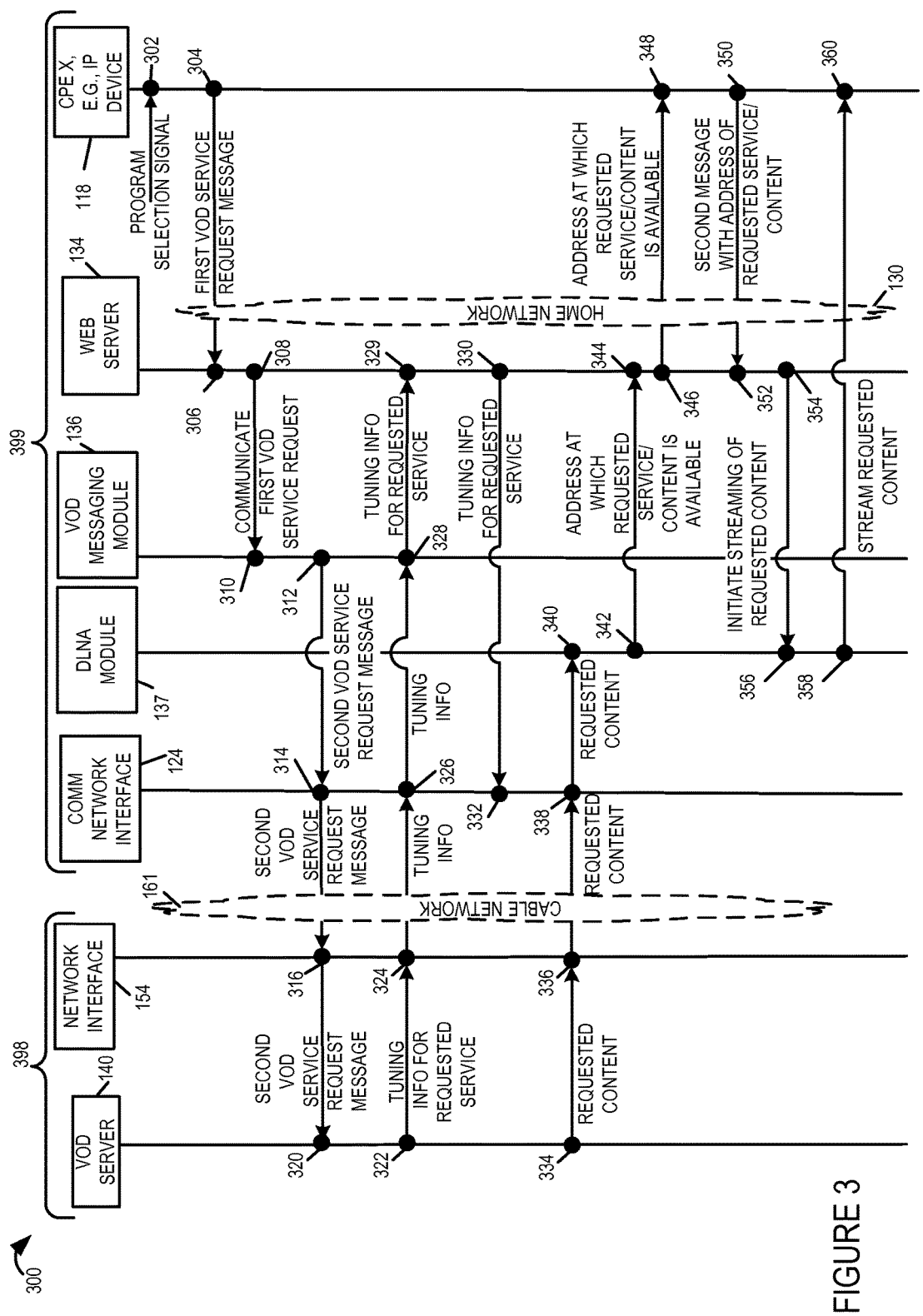
FIG. 3 illustrates the steps and associated signaling exchange between various devices performed in an exemplary embodiment implemented using the system shown in FIG. 1.

A second exemplary method will now be discussed in detail with regard to the example shown in FIG. 3. Elements of the system 100 shown in FIG. 1 which participate in the method being described in the FIG. 3 example are shown at the top of FIG. 3 and bear the same reference numbers as used in FIG. 1. Messages, information, content and/or signals communicated between devices are represented in FIG. 3 using arrows.

At the top of FIG. 3, various elements 300 of the system 100 which may participate in the exemplary method of controlling content streaming on a home network in a customer premise in accordance with one embodiment of the invention, are shown. The illustrated components 300 include the video on demand (VOD) server 140, network interface 154, communication network interface 124, DLNA module 137, video on demand (VOD) messaging module 136, Web Server application 134 and CPE X device 118, e.g., IP device which supports DLNA.

Label 398 is provided for purposes of explanation and identifies the elements and signaling, communications and exchange of information occurring in the headend 102. These headend elements include video on demand (VOD) server 140 and network communications interface 154.

Label 399 is also provided for purposes of explanation and identifies the elements and signaling, communications, and exchange of information occurring at the customer premises 1 104. The customer premise 1 104 elements include the following elements which are included in the home network gateway: communication network interface 124, DLNA module 137, video on demand messaging module 136, and web server 134. The customer premise 1 104 elements shown in FIG. 3 include home network 130 and CPE X device, e.g., IP device 118.

FIG. 3 also shows the communication network, e.g., cable network, 161 over which headend elements and customer premise 1 104 elements communicate and exchange information.

FIG. 3, illustrates the steps and associated signaling used in one exemplary embodiment where a customer, located at a customer premise, e.g., customer premise 1 104, requests and receives video on demand service from a video server 140 located in network node 102 via a home network 130. The video on demand is provided from the video on demand server 140 via a communication network, e.g., a cable network, 161 using a QAM transmission format to a home network gateway 108 and then from a home network gateway DLNA module 137 over a home network 130 using internet protocol. The streaming of the content to the requesting user's device, CPE X 118, being controlled by the home network gateway 108 so that non-authorized users/devices coupled to the home network can not obtain access to the requested video on demand content stream.

The process starts in step 302 where a program selection signal is received from a user by CPE X 118 which in this example is an IP enabled device which also supports DLNA and a proprietary web service messaging protocol implemented by the home network gateway 108. The content request may be received, e.g., when a user selects a program, e.g., from the program guide or otherwise, to watch. Such a request may be initiated, e.g., by user making a selection using a remote control. The program may be e.g., a television show, news, movie, etc. The CPE X 118 receives the content selection signal and generates a first video on demand service request message, e.g., a URL web services request message in a format in accordance with the proprietary web service message protocol. The first video on demand service request message includes a destination address which is the web server 134, a first content identifier which identifies the video on demand service being requested which corresponds to the content identified by the user's program selection signal, and a first source identifier which identifies the originator of this first video on demand service request message as the CPE X 118. The source identifier may also be, and in some embodiments is, a unique global unique identifier which corresponds to a device's IP address and/or its MAC address. The content identifier may be a video on demand service name or identifier. The source identifier may be a MAC address or internet protocol address associated with the CPE X 118 device. In step 304 the first video on demand service request message is transmitted from CPE X 118 via a home network interface in the CPE X 118 device via the home network which may be an Ethernet local area network to the web server 134 included in the home network gateway 108.

In step 306, the web server 134 included in the home network gateway 108 receives the first video on demand service request message and parses the message. The web server 134 stores a portion of the first video on demand service request message in memory 122. A portion of the first video on demand service request message can include the entirety of the message. Included in the portion of the first video on demand service request message that is stored is the first source identifier and the first content identifier. Processing proceeds to step 308.

In step 308 web server 134 communicates the first video on demand service request to the video on demand messaging module 136. The web server is not configured to communicate with the video on demand server but the video on demand messaging module is configured to communicate with the video on demand server 140. Processing proceeds to step 310.

In step 310, video on demand messaging module 136 generates a second video on demand service request message in a format understood by said video on demand server 140 corresponding to and based upon said first video on demand service request message. Processing proceeds to step 312.

In step 312, the video on demand messaging module 136 transmits the second video on demand service request message to the video on demand server 140 included in the network node/headend 102. Processing proceeds to step 314. In step 314, the second video on demand service request message is received by said communication network interface 124 of home network gateway 108 and transmitted to the network interface 154 of said network node 102 over the communication network which is a QAM cable network 161 in this example. Processing proceeds to step 316.

In step 316, the network interface 154 receives the second video on demand service request message and directs the message to the video on demand server 140. In step 320, the video on demand server 140 receives the second video on demand service request message and parses the message. In some embodiments, the video on demand service request message accesses the customer database 146 and billing server 148 to determine if the customer of customer premise 1 104 is authorized to receive the requested video on demand. If the customer is not authorized to receive the video on demand service requested, the request is denied and a message indicating the denial of the service request is transmitted back the video on demand service messaging module which in transmits the denial of service to the web server 134 which transmits the denial of the service request to CPE X 118. These denial of service messages have not been shown in the example of FIG. 3. In some embodiments, the source identifier of the device is included in the second video on demand service request message sent to the video on demand server and this source identifier is used to verify whether this particular device is authorized to receive the requested content. In some embodiments, whether the particular device is authorized to view the requested content is accomplished by the home network gateway which receives a list of authorized devices from the network node 102 as to which devices are authorized to receive particular services. In this way policing of streaming of content is achieved at the customer premises instead of in the network node/headend 102.

The video on demand server 140 upon determining that the customer is authorized to receive the requested video on demand content in step 320 establishes or causes to be established a video on demand session in step 322. In step 322 the tuning information associated with the video on demand session, e.g., QAM format type, frequency and channel on which the content to be streamed from the network node 102 to the home network gateway is determined and is transmitted from the network node 102 to the home network gateway 108. In step 322 the video on demand server 140 either transmits or causes to be transmitted the tuning information for the requested service. Processing proceeds to step 324.

In step 324, the network interface 154 receives the tuning information and transmits the tuning information for the requested service over the cable network 161 to the communication network interface 124 of the home network gateway 108. Processing proceeds to step 326. In step 326, the communication network 124 receives the tuning information for the requested service. Also in step 326 the communication network interface 124 communicates the tuning information for the requested service to the video on demand messaging module 136. Processing proceeds to step 328. In step 328, the video on demand messaging module receives the tuning information for the requested service. The video on demand messaging module communicates this information to web server 134. Processing then proceeds to step 329.

In step 329 the web server 134 receives the tuning information for the requested service and stores it in storage 121 of memory 122 associated with the portion of the first video on demand service request message to which the tuning information corresponds. Processing then proceeds to step 330. In step 330 the web server 134 communicates the tuning information for the requested service to the communication network interface 124. In some embodiments the tuning information for the requested service is also provided to the DLNA module 137. In some embodiments, the tuning information for the requested service is communicated to the communication network interface 124 and/or the DLNA module 137 from the video on demand messaging module in step 328. In those embodiments the web server 134 does not need to communicate the tuning information to the communication network interface 124 or the DLNA module 137. In some embodiments, the content identifier, e.g., service the requested service name and/or content identifier is provided to the DLNA module with or without with the associated tuning information. Processing proceeds from step 330 to step 332.

In step 332, the communication network interface 124 receives the tuning information and configures tuner/demodulator 1 125 to receive the video on demand content stream to be transmitted in accordance with the tuning information. Processing proceeds to step 334. In step 334 the video on demand server retrieves the requested video on demand content from the content/video storage 144 and communicates the requested content to network interface 154. Processing proceeds to step 336. In step 336 the network interface 154 receives and transmits/streams the requested content over the cable network 161 in quadrature amplitude format on the frequency and channels identified in the tuning information provided to the home network gateway 108 corresponding to the requested service/content. Processing proceeds to step 338.

In step 338, the requested content is received by the tuner/demodulator 1 125 of the communication network interface 124. Also in step 338 the communication network 124 communicates the received requested content to the DLNA module 137 along with some or all of the tuning information corresponding to the received content and/or a content identifier such as a service name. Processing proceeds to step 340.

In step 340 the DLNA module 137 receives the content and associated information communicated by the communication network interface 124. The DLNA module stores the received content and associated information in DLNA content storage 138. The DLNA content storage may be, and in most embodiments is, secure storage. The content may be, and in at least some embodiments is, stored in an encrypted format. Processing proceeds to step 342.

In step 342, the DLNA module publishes the location/address at which the requested content has been stored and/or is accessible. This publication identifies to all DLNA supported devices on the home network the address/location of the requested content. The DLNA module as part of the publication step communicates the address/location at which the requested service content is stored and/or is available to the web server 134 along with information sufficient to identify that the requested content corresponds to the content requested by the first video on demand service request message. In some embodiments this information includes a content identifier such as the service name which will match the first content identifier. In some embodiments, this information includes a portion or all of tuning and/or other information associated with the content. Processing proceeds to step 344.

In step 344, the web server 134 receives the communication of the address/location of requested content and any associated information corresponding to the requested content communicated by the DLNA module. The web server 134 stores in storage 121 of memory 122 the address/location of the requested content and any associated information provided by the DLNA module. The web server 134 associates this information with the information previously stored in memory 122 in connection with the first video on demand service request message. Processing proceeds to step 346.

In step 346, web server 134 as part of the publication process transmits the address/location at which the requested service/content is available to the CPE X 118. The information is transmitted via home network interface 126 over the home network 130 to the CPE X 118 and is a response to the first video on demand service request message. The message is transmitted using the proprietary web service protocol. In some embodiments, the message is in the form of http link including a uniform resource locator to the address/location of the requested content. Processing proceeds to step 348.

In step 348 the CPE X 118 receives the message from the web server 134. CPE X 118 then parses the message and stores a portion of the message in memory in the CPE X 118 device wherein the portion of the message may include the entire message. Processing proceeds to step 350.

In step 350, the CPE X 118 generates and transmits a second message with the address of the requested service/content received in step 348 over the home network 130 to the web server 134. In this exemplary embodiment the message includes a uniform resource locator for the requested content, source identifier identifying the CPE X 118 device for example the MAC or internet protocol address or global unique identifier. This source identifier will be the same as the source identifier included in the first video on demand service request message transmitted. The source identifier is unique to the device. In this exemplary embodiment, the second message is a web service message and also includes the destination address of the web server 134 and a content identifier which is the same as the first content identifier included with the first video on demand service request message. In some embodiments, this second message is automatically generating by the CPE X 118 device in response the web services message received from the web server 134 including the address at which the requested service/content is stored/available. In some embodiments in which an http link is provided by the web server 134, the second message is generated by selecting the http link which is an actionable link. Processing proceeds to step 352.

In step 352, the web server 134 receives the second message from CPE X 118 parses the message and compares the source identifier included in the second message with the source identifier included in the first video on demand service request message. Processing then proceeds to step 354.

In step 354, the web server 134 determines that the second message requesting the requested content be streamed from the DLNA content storage 139 is authorized to receive the requested content because the source identifier of the second message matches the source identifier of the first video on demand service request message. Web server 134 communications this determination to the DLNA module 137 and signals that streaming of the requested content should commence. Processing proceeds to step 356.

In step 356, the DLNA module receives the signal that the streaming of the requested content should be initiated to the CPE X 118. Processing proceeds to step 358. In step 358, the DLNA content streaming module 139 streams the requested content from the DLNA content storage 139 to the CPE X 118 device over home network 130 as a stream of IP packets via home network interface 126.

The CPE X 118 device upon receiving the content stream may, and in some embodiments does, decode, decrypt and display said received content stream to a display which is included in said CPE X 118 device or attached to said CPE X 118 device. In some embodiments, the CPE X 118 device may store the received content stream in memory for playback at a later time.

If the second message received at web server 134 was not originated from the CPE X 118 device but was originated from another device, e.g. CPE 3 116 and therefore did not have a matching source identifier the request for service is denied by the web server 134 and the content is not streamed to CPE 3 116 or CPE X 118. If a third message is then generated by CPE X 118 including the address of the requested service/content and transmitted to the web server 134 then the third message would be evaluated in the same manner as described above and the system would operate as previously described in connection with steps 352, 354, 356, 358, and 360 when said second message which had been generated by the first device CPE X 118.

Figure 4A:
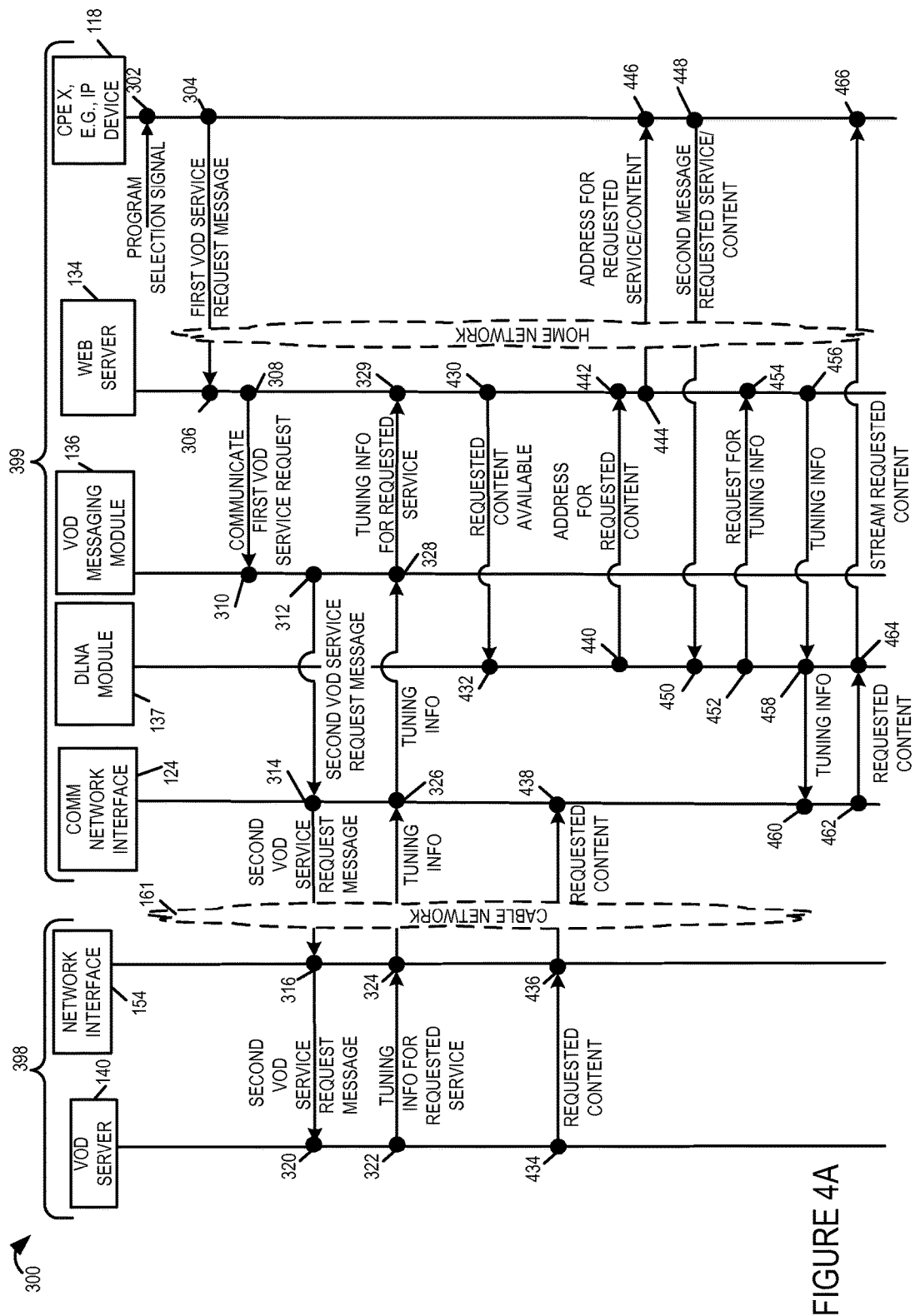
FIG. 4A illustrates the steps and associated signaling exchange between various devices performed in an exemplary embodiment implemented using the system shown in FIG. 1 wherein requested content is streamed to an authorized requesting device.

A third exemplary method will now be discussed in detail with regard to the example shown in FIG. 4A. Elements of the system 100 shown in FIG. 1 which participate in the method being described in the FIG. 4A example are shown at the top of FIG. 4A and bear the same reference numbers as used in FIG. 1. Messages, information, content and/or signals communicated between devices are represented in FIG. 4A using arrows.

At the top of FIG. 4A, various elements 300 of the system 100 which may participate in the exemplary method of controlling content streaming on a home network in a customer premise in accordance with one embodiment of the invention, are shown. The illustrated components 300 include the video on demand (VOD) server 140, network interface 154, communication network interface 124, DLNA module 137, video on demand (VOD) messaging module 136, web server application 134 and CPE X device 118, e.g., IP device which supports DLNA.

Label 398 is provided for purposes of explanation and identifies the elements and signaling, communications and exchange of information occurring in the headend 102. These headend elements include video on demand (VOD) server 140 and network communications interface 154.

Label 399 is also provided for purposes of explanation and identifies the elements and signaling, communications, and exchange of information occurring at the customer premises 1 104. The customer premise 1 104 elements include the following elements which are included in the home network gateway: communication network interface 124, DLNA module 137, video on demand messaging module 136, and web server 134. The customer premise 1 104 elements shown in FIG. 3 include home network 130 and CPE X device, e.g., IP device 118.

FIG. 4A also shows the communication network, e.g., cable network, 161 over which headend elements and customer premise 1 elements communicate and exchange information.

FIG. 4A, illustrates the steps and associated signaling used in one exemplary embodiment where a customer, located at a customer premise, e.g., customer premise 1 104, requests and receives video on demand service from a video server 140 located in network node 102 via a home network 130. The video on demand is provided from the video on demand server 140 via a communication network, e.g., a cable network, 161 using a QAM transmission format to a home network gateway 108 and then from a home network gateway DLNA module 137 over a home network 130 using internet protocol. The streaming of the content to the requesting user's device, CPE X 118, being controlled by the home network gateway 108 so that non-authorized users/devices coupled to the home network can not obtain access to the requested video on demand content stream.

The steps 302 to 329 of FIG. 4A are the same or similar to the like number steps of FIG. 3 and thus will not be described again in connection with the method of FIG. 4A. The tuning information received in step 329 by the web server 134 may be, and in some embodiments is stored in a table, e.g. table 600, in storage 121 of memory 122.

Figure 6B:
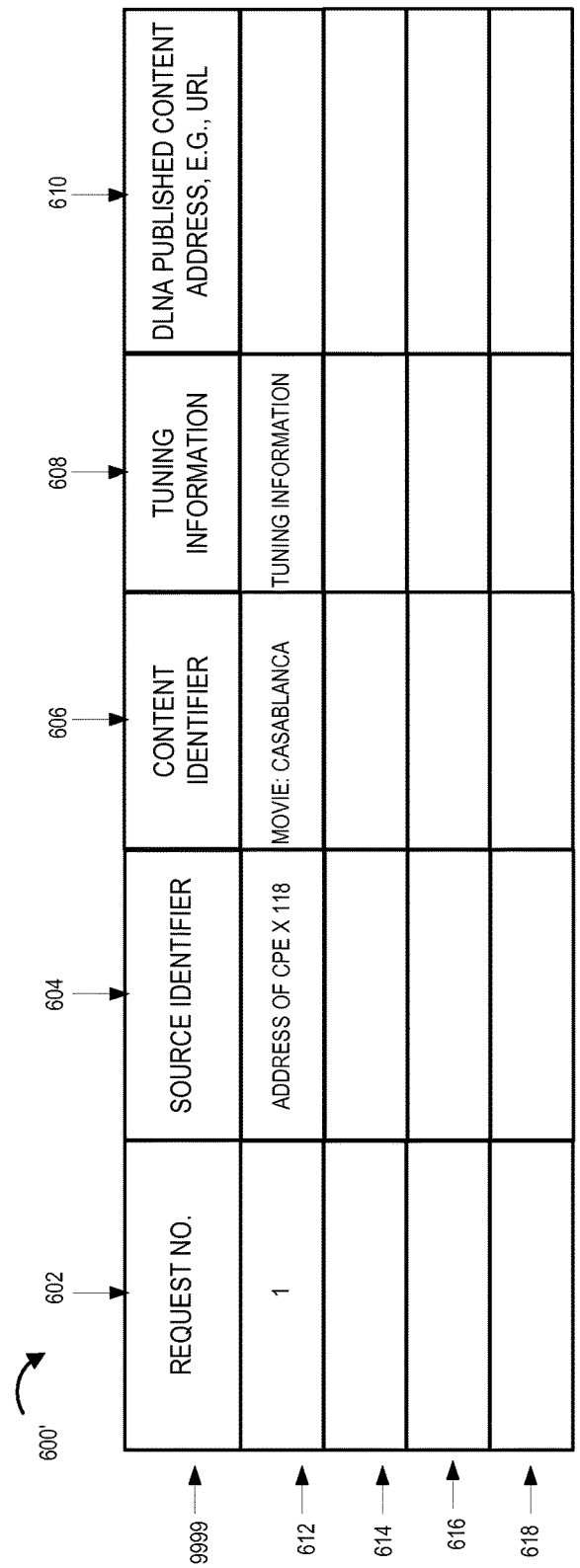
FIG. 6B illustrates an exemplary table of service requests and associated information stored in memory an used in accordance with one embodiment of the present invention.
Figure 6C:
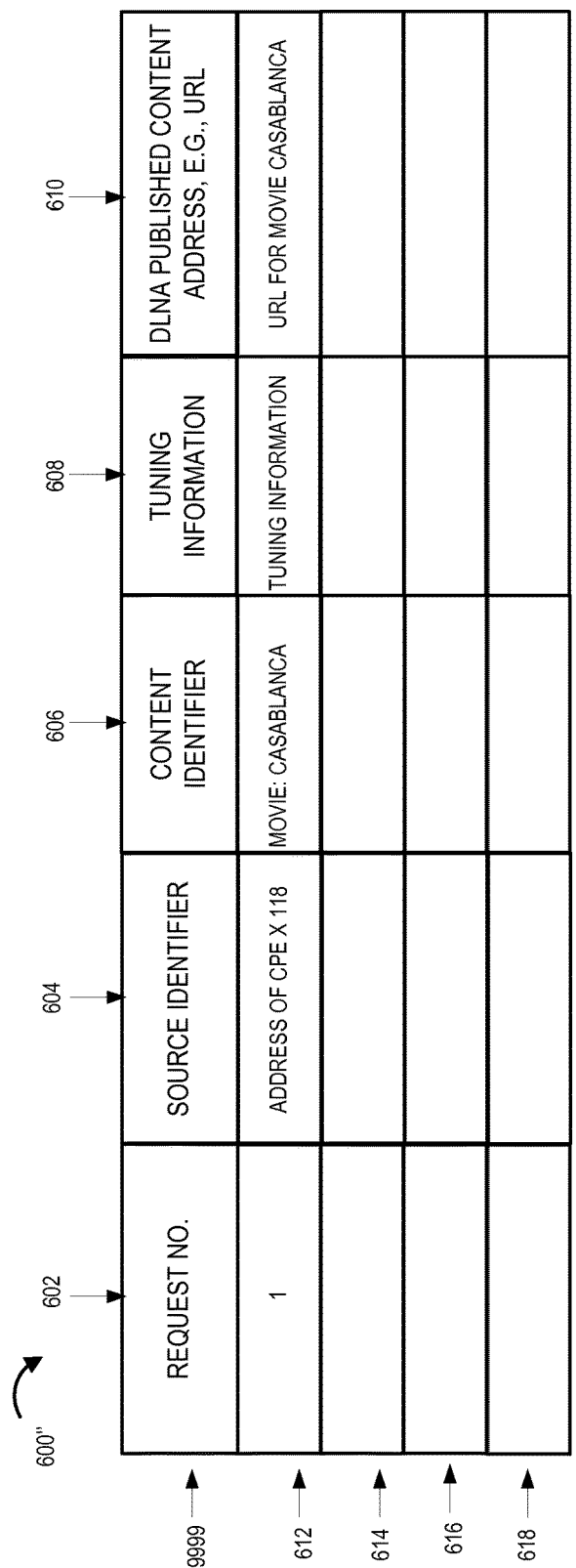
FIG. 6C illustrates an exemplary table of service requests and associated information stored in memory an used in accordance with one embodiment of the present invention.

FIGS. 6A, 6B and 6C illustrate an exemplary table 600 in which in some embodiments the web server 134 stores information associated with requests for service in connection with the present invention. FIGS. 6A, 6B and 6C will be used to show how the table is populated by the web server 134 in view of the processing steps shown in FIG. 4A. The first row 9999 of table 600 is not part of the table but is merely provided for explanatory purposes. The table 600 contains five columns of data columns 602, 604, 606, 608, and 610 and four rows 612, 614, 616 and 618. Each row of data contains information associated with a request for service/content. While four rows have been shown the number of rows will typically reflect the number of active requests received by the home network gateway from devices coupled to the home network.

Column 602 contains the request number, column 604 contains the source identifier related to the request which identifies the originator of the request, column 606 includes the content identifier which identifies the content/service being requested, column 608 includes the tuning information received from the network node/headend on which the requested content can be received, and column 610 includes the DLNA published content address, e.g., the URL associated with the content identified in column 606.

For example, information associated with the first video on demand service request received from the first device in step 306 in this example is stored in the first row of the table 600 containing data in FIG. 6 which is row 612. In this example, the information contained in row 612 associates various pieces of information corresponding to the first service request received from the first device CPE X 118. In step 306, the web server 134 inputs the number 1 in the table entry corresponding to row 612 column 602 to indicate that this is the first request. In step 306, the web server 134 also updates table 600 row 612 to include the source identifier and content identifier contained in the first video on demand service request message. The source identifier in this example is the address of CPE X 118 and is placed in table entry row 612 column 604. The content identifier is the Movie: Casablanca and is placed in table entry row 612 column 606.

In step 329 the web server 134 receives the tuning information for the requested service which in this example is the Movie: Casablanca. The tuning information, e.g., QAM tuning triplet, associated with the content identifier is then stored by the web server 134 in the table entry corresponding to row 612 column 608 as shown in FIG. 6B.

Upon receipt and storage of the tuning information by the web server 134 in step 329 of the method of FIG. 4A, processing proceeds to step 430.

In step 430 the web server 134 communicates to the DLNA module 137 that the requested content is available for streaming. For example, the web server 134 may, and in some embodiments does, notify the DLNA module 137 that the content associated with content identifier Movie: Casablanca is available. Processing then proceeds to step 432. In step 432, the DLNA module 137 updates a table of available content to include the content identifier communicated by the web server 134.

In step 434 the video on demand server retrieves the requested video on demand content from the content/video storage 144 and communicates the requested content to network interface 154. Processing proceeds to step 436. In step 436 the network interface 154 receives and transmits/streams the requested content over the cable network 161 in quadrature amplitude format on the frequency and channels identified in the tuning information provided to the home network gateway 108 corresponding to the requested service/content. Processing proceeds to step 438. In step 438, the requested content is received by the communication network interface 124. In some embodiments the streaming of the requested content in steps 434 to step 438 occurs in parallel with the transmission of the tuning information with steps 322 to 326. In some embodiments, the streaming of the requested content from the network node/headend 102 occurs once the associated VOD QAM session has been established. In some embodiments, streaming of the requested contested is initiated from the network node/headend upon confirmation from the home network gateway 108 that the tuning information has been received and streaming should commence.

After step 432, processing in the home network gateway proceeds to step 440 in which the home network gateway 108 and in particular the DLNA module 137 publishes that the requested content associated with the content identifier is available. In this example, the DLNA module 137 communicates the address for the requested content, e.g., a URL, to the web server 134. In step 440, as part of the publication the address of the requested contented, e.g., the URL, is made available to devices that query the DLNA web server 133 for available content. For example, in at least some embodiments the DLNA client devices coupled to the home network are able to access to a DLNA web server page 133 listing the content available, e.g., the content identifier and its associated URL. Processing from step 440 to step 442.

In step 442, the address for the requested content is received by web server 134. The web server 134 stores the address for the requested content in table 600 in the table entry corresponding to row 612 column 610. In this example, the DLNA published content address is the URL for the Movie: Casablanca which was the requested content. Processing proceeds from step 442 to step 444.

In step 444, the web server 134 transmits a message to the CPE X 118 device responding to the CPE X 118 first video on demand service request message which was transmitted to the web server 134 in step 304. In some embodiments the identification of the addressee of the message is determined by retrieving the source identifier information from table 600. The message contains the address at which the requested service/content, i.e., the Movie: Casablanca is available/stored. In this example, the web server 134 includes the URL provided by the DLNA module 137 in the message. The message is communicated from the web server 134 via home network interface 126 over the home network 130 to the CPE X 118. Processing proceeds to step 448.

In step 446, CPE X 118 receives the message via its home network interface and stores a portion of the message including the address information for the requested content, e.g., the URL for the Movie: Casablanca in its storage memory. The portion of the message may include the entirety of the received message. Processing proceeds to step 448.

In step 448, the CPE X 118 device generates a second message including its source identifier in this example the address of CPE X 118 and the address, e.g., URL, provided by the web server 134 to request the streaming of the requested video on demand content Movie: Casablanca from the DLNA module 137. For example, the CPE X 118 sends a request including it source identifier and the received URL, e.g., a URL resolution request, to the DLNA web server 133 to obtain the requested content. Processing proceeds to step 450.

In step 450, the DLNA web server 133 receives the second message from the CPE X 118 device with the DLNA address of the requested content, e.g., the URL for the Movie: Casablanca and the source identifier of the second message which is address of the CPE X 118 device. Processing proceeds to step 452.

In step 452, the DLNA web server 133 sends a request to the web server 134 for the tuning information associated with the DLNA address in the second message which is associated URL for the Movie: Casablanca. Also included in this request to the web server 134 is the source identifier associated with the originator of the second message which is the address of the CPE X 118 device. In some embodiments, this request is in the form of URL resolution request wherein the DLNA web server 133 is requesting the web server 134 to resolve the URL assigned to the Movie: Casablanca. Processing proceeds to step 454.

In step 454, the web server 134 receives the request from the DLNA web server 133 to provide the tuning information for the content at the DLNA address requested by the second message. In some embodiments it receives the request to resolve the URL contained in the second message. The web server 134 upon receiving the request from the DLNA web server 133 determines whether the device associated with the source identifier provided is authorized to view the requested content associated with the DLNA address, e.g., URL provided in the request by the DLNA web server. If the requesting device is authorized to receive the requested content then the tuning information is provided otherwise the request is denied. In some embodiments, this is achieved by the web server 134 searching table 600 to identify the table entries associated with the DLNA address provided (e.g., the URL address) and then determining if the source identifier of the second message matches the source identifier associated with the DLNA address provided, e.g., URL. In this example, the URL provided is the URL for the Movie: Casablanca and is identified in table entry column 610, row 612 of FIG. 6C. The source identifier associated with the URL for the Movie: Casablanca in table 600 of FIG. 6C is shown in column 604, row 612 and is the address of CPE X 118. The web server 134 verifies that the source identifier received with the request from the DLNA web server 133 matches the source identifier of the first device that second the first video on demand service request message. In this case it does as they are both the address of the CPE X 118. Upon determining that the device is authorized to view the requested content associated with the URL processing proceeds to step 456. In cases in which the source identifiers do not match the request is denied, e.g., by the web server 134 not resolving the URL resolution request received from the DLNA web server 133. An example in which the second message is received from a non-authorized device is explained in connection with the steps of FIG. 4B.

In step 456, the web server 134 communicates the requested tuning information to the DLNA web server 133. In some embodiments, the web server 134 obtains the tuning information associated with the URL that is communicated to the DLNA web server 133 from the table 600 in FIG. 6C by retrieving the tuning information stored in table entry corresponding to row 612 column 608. In some embodiments where the DLNA web server 133 had requested that the web server 134 resolve the URL address of the second message, the web server resolves the URL resolution request therein providing the tuning information to the DLNA web server 133. Processing proceeds to step 458.

In step 458, the DLNA web server 133 receives the tuning information from the web server 134 and communicates the tuning information to the communication network interface 124. Processing proceeds to step 460.

In step 460, the communication network interface 124 receives the tuning information and configures tuner/demodulator 1 125 to receive the video on demand content being streamed in accordance with the tuning information. In this example, the Movie: Casablanca. The transmitted video on demand content stream is streamed in a quadrature amplitude modulation format and is received at a tuner/demodulator at tuner/demodulator 1 125 of the communications network interface 124 of the home network gateway 108. In at least some embodiments the encoder/decoder 123 operates to decode and decrypt the received content stream. Processing proceeds to step 462.

In step 462, the communication network interface 124 sends the requested content being received to the DLNA module 137. Processing proceeds to step 464.

In step 464, the DLNA module 137 receives the requested content stream. The DLNA module 137 may, and in some embodiments, does store the content in the DLNA content storage 138. The content may be stored in secure memory and/or may be stored in encrypted format. The DLNA content streaming module initiates streaming of the requested content in this example the Movie: Casablanca via the home network interface 126 over the home network 130 to CPE X 118. The content may be, and in some embodiments is streamed in encrypted format. The content may be, and in some embodiments is, streamed as a unicast internet protocol stream to CPE X 118. Processing proceeds to step 466.

In step 466, the CPE X 118 device receives the content stream for the Movie: Casablanca via it home network interface and decodes and decrypts the content stream as required. The CPE X 118 device in some embodiments displays the received content onto a display that is a part of the CPE X 118 device or is attached to the CPE X 118 device. In some embodiments, the CPE X 118 device stores the streamed content in its storage memory.

An example wherein the method described in connection with FIG. 4A is now described for the case wherein the second message is received from an unauthorized device. This example is shown in connection with FIG. 4B. Elements of the system 100 shown in FIG. 1 which participate in the method being described in the FIG. 4B example are shown at the top of FIG. 4 and bear the same reference numbers as used in FIG. 1. Messages, information, content and/or signals communicated between devices are represented in FIG. 4B using arrows.

Figure 4B:
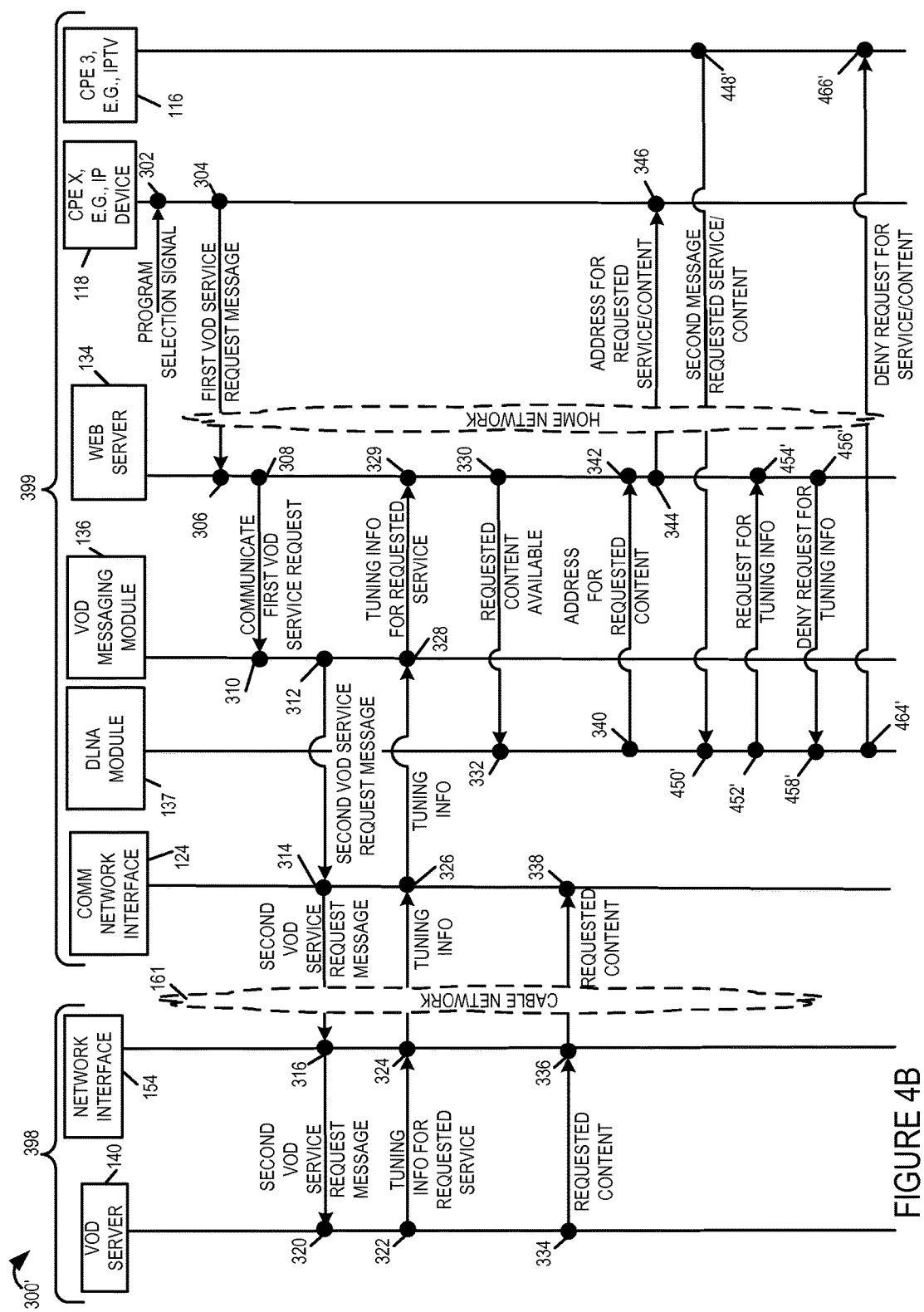
FIG. 4B illustrates the steps and associated signaling exchange between various devices performed in an exemplary embodiment implemented using the system shown in FIG. 1 wherein requested content is not streamed to unauthorized requesting device.

At the top of FIG. 4B, various elements 300' of the system 100 which may participate in the exemplary method of controlling content streaming on a home network in a customer premise in accordance with one embodiment of the invention, are shown. The illustrated components 300' include the video on demand (VOD) server 140, network interface 154, communication network interface 124, DLNA module 137, video on demand (VOD) messaging module 136, Web Server application 134 and CPE X device 118, e.g., IP device which supports DLNA, and CPE 3 device 116, e.g., IPTV device which supports DLNA. The CPE X device 118 and CPE 3 device 116 are DLNA clients. It will be appreciated that the elements 300' of FIG. 4B are the same as the elements of 300 of FIG. 4A with the exception of the additional CPE device, CPE 3 device 116.

Label 398 is provided for purposes of explanation and identifies the elements and signaling, communications and exchange of information occurring in the headend 102. These headend elements include video on demand (VOD) server 140 and network communications interface 154.

Label 399 is also provided for purposes of explanation and identifies the elements and signaling, communications, and exchange of information occurring at the customer premises 1 104. The customer premise 1 104 elements include the following elements which are included in the home network gateway: communication network interface 124, DLNA module 137, video on demand messaging module 136, and web server 134. The customer premise 1 104 elements shown in FIG. 3 include home network 130, CPE X device, e.g., IP device 118, and CPE 3 device 116.

FIG. 4B also shows the communication network, e.g., cable network, 161 over which headend elements and customer premise 1 elements communicate and exchange information.

FIG. 4B, illustrates the steps and associated signaling used in one exemplary embodiment where a customer, located at a customer premise, e.g., customer premise 104, requests video on demand service from a video server 140 located in network node 102 via a first device at home network 130 and a second unauthorized device requests to be provided the video on demand requested by the first device. The video on demand is provided from the video on demand server 140 via a communication network, e.g., a cable network, 161 using a QAM transmission format to a home network gateway 108 and then from a home network gateway DLNA module 137 over a home network 130 using internet protocol. The streaming of the content to the requesting user's device, CPE X 118, being controlled by the home network gateway 108 so that non-authorized users/devices coupled to the home network can not obtain access to the requested video on demand content stream.

The steps 302 to 329 of FIG. 4B are the same or similar to the like numbered steps of FIG. 3 and FIG. 4A and thus will not be described again in connection with the example of FIG. 4B. The steps 330 to 346 of FIG. 4B are the same or similar to the like numbered steps of FIG. 4A and thus will not be described again in connection with the example of FIG. 4B. Table 600" of FIG. 6C contains the information associated with the first video on demand service request message.

In step 444, the address, e.g., URL for the Movie: Casablanca, was published to the DLNA clients on the home network.

In step 448', the user of CPE 3 device 116 upon reviewing the available content which was published selects the Movie: Casablanca. The CPE 3 device 116 generates a message which will be referred to as the second message and transmits the message via its home network interface over the home network 130 to the DLNA web server 133 of the DLNA module 137 of the home network gateway 108. Included in the message is the source identifier of the CPE 3 device 116 which is the address of the CPE 3 device and the published DLNA address of the requested content which is the URL for the Movie: Casablanca. Processing proceeds to step 450'.

In step 450' the DLNA web server 133 of the DLNA module 137 receives the second message and parses the message. Processing then proceeds to step 452'.

In step 452' the DLNA web server 133 sends a request to the web server 134 to provide the tuning information associated with the DLNA address, e.g., URL for Movie: Casablanca included in the second message. Included in the request is the source identifier (CPE 3 device 116 address) and DLNA address 137 (URL for Movie: Casablanca) received with the second message. In some embodiments, the DLNA web server 133 sends a request to the web server 134 to resolve the URL address received in the second message along with the source identifier of the originator of the second message. Processing proceeds to step 454'.

In step 454', the web server 134 receives the request for tuning information from the DLNA module's DLNA web server 133. The web server 134 determines whether the requesting device having the source identifier provided by the DLNA web server 133 is authorized to view the requested content stream, e.g., the Movie: Casablanca. If the source identifier provided matches an authorized device then the tuning information is provided as was described in connection with FIG. 4A. If the source identifier provided does not match an authorized device then the service request is denied wherein the tuning information is not provided. In this example, the web server 134 retrieves the source identifier associated with the URL for the Movie: Casablanca from memory. For example, the source identifier is retrieved from table entry row 612 column 604 of table 600" shown in FIG. 6C. The source identifier is the address of the CPE X 118 which sent the first video on demand service request message. The web server 134 compares the retrieved source identifier with the source identifier of the originator of the second message which was provided by the DLNA web server 133 in which requests. In this case, the source identifiers do not match and the web server 134 determines that the originator of the second message is not authorized to view the requested on demand content. The web server 134 determines that the request for content should be denied. Processing proceeds to step 456'

In step 456', the web server 134 denies the DLNA web server 133 request for tuning information. In some embodiments, the web server 134 simply does not resolve the URL resolution request sent by the DLNA web server 133 to the web server 134. In some embodiments, the web server 134 sends a specific denial of service message to the DLNA web server 133 that requested the tuning information. Processing then proceeds to step 458'.

In step 458', the DLNA web server 133 receives the denial of request for tuning information from the web server 134. In some embodiments, for example in some instances in which the DLNA web server 133 requested the web server 134 to resolve the URL request for the Movie: Casablanca the request is not resolved. Processing proceeds to step 464'.

In step 464', the DLNA server 133 denies the request for service/content by the originator of the second message, CPE 3 116. The DLNA module 137 sends a denial of service/content request message to CPE 3 116 via home network interface 126 over home network 130. In some embodiments, the DLNA web server 133 fails to resolve the URL for the Movie: Casablanca included in the second message. Processing proceeds to step 466'.

In step 466', the CPE 3 device 116 receives the denial of service/content message from the DLNA server 133 via its home network interface and in some embodiments displays a message indicating that the request was denied on the display of the CPE 3 device 116 such as the display of an IPTV. In some embodiments, the message is displayed on a display coupled to the CPE 3 device 116. Processing then concludes with respect to this second message but may, and typically does, continue in connection with additional messages to the DLNA module 137 and/or the web server 134 requesting services/content. For example, if the CPE X 118 device were now to send a message to the DLNA server 133 requesting the Movie: Casablanca the message would be treated as the second message and steps 348 through 466 of the method of FIG. 4A would be implemented resulting in the streaming of the requested content, the Movie: Casablanca, to the CPE X 118 device.

In some embodiments, instead of denying the request for service in step 454' of FIG. 4B when it is determined that the source identifier of the originator of the second message is not the same as the source identifier of the first video on demand service request message, the home network gateway 108 records that an additional device is requesting the same video on-demand service/content and then authorizes the streaming of the requested content from the DLNA content storage 138. The home network gateway 108 via the VOD messaging module 136 then reports the number of additional users to which the VOD content was streamed along with their source identifier to the billing server 148 so that the users of the devices can be charged and/or the owner of the customer premise 1 104 can be charged for time the VOD content was streamed from the home network gateway's DLNA module to a device on the home network.

In some embodiments, the web server 134 upon receiving a new video on demand service request searches the DLNA content storage 138 to determine if the requested content is already stored in the memory of the home network gateway 108. If the web server 134 determines that the requested content is available in the DLNA content storage 138 it sends a message to the video on demand messaging module 136 requesting the video on demand messaging module 136 transmit a message to the video on demand server 140 to determine if the requester (e.g., based on the source identifier) is authorized to the receive the requested program. The video on demand messaging module 136 transmits a message requesting a response as to whether the requester is authorized to receive the requested content. The video on demand server 140 accesses the customer database 146 in the network node/headend 102 and determines whether the requester is authorized to receive the requested VOD content. The VOD server 140 sends a message back to the VOD message module 136 with the answer to the request which is then provided the web server 134. If the answer indicates that the requester is not authorized to receive the requested video on demand content then a denial of request for service/content message is transmitted to the requesting device. If the answer indicates that the requester is authorized to receive the requested video on demand content then the web server 134 provides the DLNA address, URL, for the requested content to the requester in response to the video on demand service request. Upon the streaming of the requested content to the requesting device from the DLNA content storage 138, the home network gateway 108, e.g., the video on demand messaging module reports that the content was streamed from the home network gateway 108 to the video on demand server which will then update the customer database 146 and billing server 148 so that the customer can be charged. In this way, if the requested content is already stored in the home network gateway 108 then the content does not have to be streamed from the network node/headend 102 thereby making the QAM bandwidth available for other uses.

In some embodiments of the present invention, the home network gateway 108 transmits to the network node/headend customer database a list of global unique identifier coupled to the home network gateway 108 of customer premise 1 104 for billing and tracking purposes with information on which devices are not authorized to receive certain services such as video on demand services generally or particular video on demand services or switched digital video services generally or particular switched digital video services. These authorizations are then utilized in responding to video on demand service requests.

In some embodiments, the home network gateway 108 maintains a list of global unique device identifiers along with information regarding the authorizations to received video on demand content associated with each device. The home network gateway 108 tracks what devices have received video on demand content from the DLNA content storage and reports that information to the billing server 148 for billing purposes thereby off loading the processing associated with the determination of which devices are authorized to receive requested content and the tracking of the content streamed to each device. In some embodiments, the information of what DLNA content was streamed to which devices is transmitted to the network node/headend 102, e.g., to the customer database 146 and billing server 148 on a periodic base such as for example once a day when the communication network load is experiencing load traffic load.

The following is another example of one embodiment in accordance with the present invention. For exemplary purposes this example is explained using the system 100 of FIG. 1. An IP set-top box, e.g., CPE X 118 wants to watch live streaming content, e.g., switched digital video content, that is provided by the home network gateway 108. The home network gateway 108 in this example is implemented as a set-top box including the elements shown in FIG. 1 in connection with the home network gateway 108. The IP set-top box sends a request to the home network gateway 108 using a proprietary web service. The home network gateway 108 saves this request in memory and returns a uniform resource locator (URL) to the IP set-top box over the home network 130. The IP set-top box requests to stream the live content through the DLNA module 137. When the home network gateway 108 receives the request it matches the DLNA request to the earlier request done through the web service and then allows streaming of the content.

In another example in accordance with one embodiment of the present invention also explained using the system of FIG. 1, an unauthorized device, e.g., CPE 2 112, sends a request to the home network gateway 108 over the home network 130. The home network gateway in this example is implemented as a set-top box including the elements shown in FIG. 1 in connection with home network gateway 108. The home network 130 is a local area network. When the home network gateway 108 receives the request from the unauthorized device it tries to match the data it has received from its web service. When it sees that there was no corresponding request it refuses to resolve the item the unauthorized device requested. This prevents the unauthorized device from streaming the content over the DLNA.

The two aforementioned examples rely on the use of a proprietary web service and DLNA. In these examples, there is a step in the DLNA where the home network gateway implemented as a set-top box has to resolve the locator (the QAM triplet, e.g., tuner triplet) so the software stack of the home network gateway can stream the video over DLNA. By using this approach, a decision to stream or not stream the content can be made when the home network gateway resolves this locator based on the request received over the proprietary web services. In this way, while the DLNA standard is designed with transparency in mind, wherein any content published to the local network is accessible by any other device on the local network, the apparatus and methods of the present invention provide some control on what devices are able to access the published content.

The following is another example of an embodiment in accordance with the present. In this example which will be explained in connection with the system of FIG. 1, an IP set top box, e.g., CPE X 118 wants to start a video on demand session. It sends its request to a home network gateway 108 located on the home network 130 using a proprietary web service. The home network 130 may have one or more home network gateways located on the home network and coupled to the communication network 161. The home network gateway 108 in this example is implemented as a set-top box including the elements shown in FIG. 1 in association with home network gateway 108. The home network gateway 108 upon receiving the request from the IP set top box sets up a traditional video on demand session over the communication network, e.g., cable network 161, which in this example is a Quadrature Amplitude Modulation network. After the session is setup the home network gateway 108 captures the QAM triplet, that is the tuning information, of the video on demand session and publishes it to the DLNA module 137. The home network gateway 108 then passes a uniform resource locator (URL) to the IP set-top box CPE X 118 where it can begin watching the video on demand session over the home network 130. Trick modes (fast forward/rewind/pause) are all handled by the home network gateway 108. This exemplary embodiment allows content to efficiently be delivered to the customer premise 104, e.g., home, using existing infrastructure such as existing cable networks. This example using a hybrid of both QAM and IP to deliver content from a video on demand server in a network node/headend 102. This hybrid solution allows the use of the existing QAM network for video delivery to the customer premise 104, and then use the convenience of HTTP/IP video delivery within the customer premise 104 over the home network 130. This approach is not limited to IP set-top boxes. IP set-top boxes are only exemplary. Any device that is a DLNA client and supports the proprietary web services would be able to watch video on demand content over the home network. In these additional examples the communication between the IP devices on the home network and the home network gateway are done using web services. The video is provided over the home network using DLNA. The video is delivered to the home network gateway using existing video on demand technologies. In at least some embodiments of the present invention, the client devices, e.g., CPE devices such as IP capable set top boxes, coupled to the home network are valid DLNA clients and support the proprietary web services implemented in the home network gateway and DTCP encryption so that they may receive content over the home network.

In at least some embodiments of the present invention, the home network gateway makes a determination to stream video on demand content over the home network to requesting devices based on the requesting devices authorization to receive the requested content and denies requests for streaming of content to unauthorized devices. In some embodiments, the home network gateway receives a list of authorized devices from the customer database in the network node/headend. In some embodiments, the home network gateway reports the number of devices and/or the source identifiers, e.g., global unique identifiers, that received the streamed content to the billing server in the network node/headend.

Numerous methods and apparatus are possible in view of the above discussed features.

One particular exemplary method is directed to controlling content streaming on a home network and includes the steps of receiving at a home network gateway a first video on demand service request message from a first device coupled to the home network, storing a portion of said first video on demand service request message in memory, receiving at said home network gateway a second message, and determining based on a portion of said second message and a portion of said stored first video on demand service request message whether to provide the requested video on demand service to a sender of said second message. In at least some implementations the home network is a local area network. The local area network maybe and sometimes is a network which supports use of the Internet protocol (IP), e.g., an IP network. In some embodiments the home network is an Ethernet network.

The first device maybe, and in some embodiments is, an internet protocol capable device, e.g., an internet protocol television set or set top box (with or without DVR capability), which supports IP communications. In at least some other embodiments the first device is a mobile device, e.g., a laptop or a phone. In the case where the first device is a phone, it may be a cell phone such as an iPhone, Android phone or some other type of mobile cellular telephone. In addition to embodiments where the first device is a phone, in some embodiments the first device is a tablet, e.g., an iPad, capable of receiving content via IP communications and displaying the content on a display device included in the tablet.

In at least some implementations of the exemplary method, the first video on demand service request message is a request that is received at a web server included in said home network gateway. In one such embodiment the first video on demand service request message includes a first source identifier, said first source identifier identifying said first device, said first source identifier being part of said portion of said first video on demand service request message that is stored in memory. The first source identifier includes, in at least some embodiments, at least one of a MAC address or an internet protocol address corresponding to the first device. In at least one embodiment the first source identifier is a global unique identifier that corresponds to the first device's home network address or MAC address or was assigned by the home network gateway.

In at least one embodiment the second message received at said home network gateway includes a second source identifier where the second source identifier identifies the sender from which the second message originated. The sender of the second message may be the same or a different entity from the sender of the first message. When the sender of the second message is a different entity then the sender of the first message the second source identifier will be different than the first source identifier. However, when the sender of the second message is the same as the sender of the first message the second source identifier will be the same as the first source identifier or will at least identify the same device as the sender of the first and second messages.

In at least some cases the second message is generated in response to the home network gateway publishing an address at which the video on demand service requested is available. Thus, in one such embodiment the second message is sent after the device sending the second message receives the published address which indicates where the video one demand service that was requested by the first device is available.

The step of determining, based on a portion of said second message and a portion of said stored first message whether to provide the requested video on demand service to said sender of said second message includes in some but not necessarily all embodiments comparing said first source identifier with said second source identifier to determine if they match or if they do not match.

In some implementations when said comparing determines that said first source identifier and said second source identifier do not match, e.g., the device which sent the second request is different from the device which sent the first request, the method further includes denying providing said requested video on demand service to said sender of said second message. However, when the comparing determines that the first source identifier and the second source identifier do match, in at least some implementations the step of determining based on a portion of said second message and a portion of said stored first message whether to provide the requested video on demand service to said sender of said second message further includes comparing a first requested content identifier with a second requested content identifier to determine if they match or if they do not match. The first requested content identifier in at least some embodiments is part of said portion of said first video on demand service request message stored in memory and said second content identifier is a portion of said second message.

In one exemplary embodiment when the comparing of the first content identifier to the second content identifier determines that the first content identifier and said second content identifier do not match the method further includes denying providing the requested video on demand service to said sender of second message. This may be done by intentionally failing to respond to the request. However, when the comparing of the first content identifier with the second content identifier determines that said first content identifier and said second content identifier do match, e.g., indicating that the first and second requests were from the same device, the method further includes streaming from said home gateway network a content stream to said first device.

In one particular implementation of a method controlling content streaming on a home network the method includes the steps of receiving at a home network gateway a first video on demand service request message from a first device coupled to the home network, storing a portion of said first video on demand service request message in memory, receiving at said home network gateway a second message and determining based on a portion of said second message and a portion of said stored first video on demand service request message whether to provide the requested video on demand service to a sender of said second message and transmitting in response to said first video on demand service request message a second video on demand service request message, said second video on demand service request message being from said home network gateway and being directed to a video on demand server.

In at least some implementations of the particular exemplary method mentioned in the preceding paragraph, the second video on demand service request message is based upon said first video on demand service request message and the second video on demand service request message is transmitted over an external network to a video on demand server located in a network node external to a customer premise at which said home network is located. In some such embodiments the external network is a cable network and the network node is a cable headend node. In some embodiments the network node is a hubsite of the cable network.

In some embodiments the method further includes receiving at said home network gateway a content stream from said video on demand server in quadrature amplitude modulation format in response to said second video on demand service request message with the content of the received content stream being stored in memory included in said home network gateway. In some embodiment the memory is a secure memory. In some cases the content stream includes audio and/or video content.

The home network gateway in some embodiments publishes the address at which said content stream is available on said home network and then streams said content from said home network gateway to said first device when it is determined that said video on demand service requested is to be provided. As part of the process of streaming the content to first device, the content is retrieved from the secure memory.

While a logical sequencing of the processing steps of the exemplary embodiments of the methods, routines and subroutines of the present invention have been shown, the sequencing is only exemplary and the ordering of the steps may be varied.

The techniques of various embodiments may be implemented using software, hardware and/or a combination of software and hardware. Various embodiments are directed to apparatus, e.g., a media content distribution system. Various embodiments are also directed to methods, e.g., a method of controlling the distribution of media content, e.g., video on demand audio and/or video content. Various embodiments are also directed to non-transitory machine, e.g., computer, readable medium, e.g., ROM, RAM, solid state storage, silicon storage disks, CDs, hard discs, etc., which include machine readable instructions for controlling a machine to implement one or more steps of a method.

Various features of the present invention are implemented using modules. For example each of the various routines and/or subroutines disclosed may be implemented in one or more modules. Such modules may be, and in some embodiments are, implemented as software modules. In other embodiments the modules are implemented in hardware, e.g., in circuitry, ASICs, ICs, etc. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, solid state storage device, silicon storage device, etc. to control a machine, e.g., general purpose computer with or without additional hardware, to implement all or portions of the above described methods. Accordingly, among other things, the present invention is directed to a machine readable medium including machine executable instructions for causing a machine, e.g., processor and associated hardware, to perform one or more of the steps of the above described method(s).

Numerous additional variations on the methods and apparatus of the various embodiments described above will be apparent to those skilled in the art in view of the above description. Such variations are to be considered within the scope of the invention.

What is claimed is:

1. A method of controlling content streaming on a home network, the method comprising:
   receiving at a home network interface of a home network gateway, located at a customer premise, a first video on demand service request message from a first device coupled to the home network, said first video on demand service request message including a first source identifier identifying said first device as the source of said first video on demand service request message and a first content identifier identifying content requested by said first video on demand service request message, said home network gateway including, in addition to said home network interface, a second communication network interface that couples said home network gateway to an external communications network;
   storing a portion of said first video on demand service request message including said first source identifier and said first content identifier in memory used for storing video on demand service request message information, said memory including, for individual request messages which request content, a request message source identifier and an identifier of the requested content, said memory being in said home network gateway;
   receiving, at said home network interface of said home network gateway, a second message including a second source identifier identifying the source of said second message; and
   operating a processor at the home network gateway to determine, based on whether said first source identifier stored in said memory matches said second source identifier included in the second received message, whether to provide said content that was requested by said first video on demand service request message to a sender of said second message.

2. The method of claim 1, wherein said first video on demand service request message includes a first destination address of a first web server included in said home network gateway and is received at the first web server; and
   wherein said second message includes a second destination address which is different than said first destination address.

3. The method of claim 2,
   wherein said second destination address is a destination address of a second web server included in said home network gateway which is different from said first web server; and
   wherein said first video on demand service request message includes a first source identifier, said first source identifier identifying said first device, said first source identifier being part of said portion of said first video on demand service request message that is stored in memory.

4. The method of claim 1, further comprising:
   operating the home network gateway to publish an address at which the content requested by the first video on demand service request is available.

5. The method of claim 4, wherein said second message is generated in response to said home network gateway publishing the address at which the video on demand service requested is available.

6. The method of claim 4, further comprising:
   storing in said memory with said first source identifier and said first content identifier, the published address at which the first content requested by the first video on demand service request is available.

7. The method of claim 1, wherein the method further comprises:
denying providing said requested video on demand service to said sender of said second message when said first source identifier and said second source identifier do not match.

8. The method of claim 1, wherein the method further comprises:
streaming from said home gateway network a content stream to said first device when the first source identifier matches the second source identifier.

9. The method of claim 1, further comprising:
transmitting, via said second communications network interface, in response to said first video on demand service request message a second video on demand service request message, said second video on demand service request message being from said home network gateway and being directed to a video on demand server.

10. The method of claim 9,
wherein said second video on demand service request message is based upon said first video on demand service request message; and
wherein said second video on demand service request message is transmitted over said external communications network to said video on demand server being located in a network node external to the customer premise at which said home network is located.

11. The method of claim 10, further including receiving at said home network gateway a content stream from said video on demand server in quadrature amplitude modulation format in response to said second video on demand service request message.

12. The method of claim 11, further including said home network gateway publishing the address at which said content stream is available on said home network; and
further including streaming said content from said home network gateway to said first device when it is determined that said video on demand service requested is to be provided.

13. The method of claim 1, wherein storing a portion of said first video on demand service request message including said first source identifier and said first content identifier in memory used for storing video on demand server request message information includes storing said first source identifier in a set of information corresponding to said first video on demand service request message included in a table in said home network gateway used to store request message information, said set of information corresponding to said first video on demand service request message including a request identifier, said first source identifier, and said first content identifier along with tuning information and a published address corresponding to the content identified by the first content identifier.

14. The method of claim 1,
wherein said first video on demand service request message is a request for the content identified by said first content identifier; and
wherein said second message is a second request for the content identified by said first content identifier.

15. A home network gateway for controlling content streaming on a home network, the home network gateway comprising:

a home network interface, located at a customer premise, for communicating with devices coupled to said home network;
a communication network interface, located at said customer premise, for communicating with a network node, located outside said customer premise, over a communication network;
a first web server, located at said customer premise, configured to receive via said home network interface a first video on demand service request message from a first device coupled to the home network, said first video on demand service request message including a first source identifier identifying said first device as the source of said first video on demand service request message and a first content identifier identifying content requested by said first video on demand service request message;
a memory used for storing video on demand service request message information, said memory including, for individual request messages which request content, a request message source identifier and an identifier of the requested content, said memory including a stored portion of said first video on demand service request message including said first source identifier and said first content;
a second web server, located at said customer premise, configured to receive a second message addressed to said second web server, said second message including a second source identifier identifying the source of said second message via said home network interface, said second web server being different from said first web server; and
a processor at the home network gateway being configured to determine based on whether said first source identifier stored in said memory matches said second source identifier included in the second received message, whether to provide the requested video on demand service to a sender of said second message.

16. The home network gateway of claim 15 wherein:
said communication network is a Quadrature Amplitude Modulated (QAM) communication network; and
wherein said second web server is a Digital Living Network Alliance (DLNA) web server which receives video on demand content from a video on demand server, located outside said customer premise, over said QAM communication network; and
said first device and said sender of said second message are DLNA client devices.

17. The home network gateway of claim 16,
wherein the home network gateway is configured to publish an address at which the content requested by the first video on demand service request is available.

18. The home network gateway of claim 17,
wherein said memory stores the published address at which the first content requested by the first video on demand service request is available with said first source identifier and said first content identifier.

19. The home network gateway of claim 18, wherein said memory further stores tuning information with the published address at which the first content requested by the first video on demand service request is available, said first source identifier, and said first content identifier.

20. A non-transitory computer readable medium having machine executable instructions stored thereon for controlling a processor in a home network gateway located at a customer premise, the non-transitory computer readable medium including:

code for controlling the processor to receive at a home network interface of said home network gateway a first video on demand service request message from a first device coupled to the home network, said first video on demand service request message including a first source identifier identifying said first device as the source of said first video on demand service request message and a first content identifier identifying content requested by said first video on demand service request message, said home network gateway including, in addition to said home network interface, a second communication network interface that couples said home network gateway to an external communications network;

code for controlling the processor to store a portion of said first video on demand service request message including said first source identifier and said first content identifier in memory used for storing video on demand server request message information, said memory including, for individual request messages which request content, a request message source identifier and an identifier of the requested content, said memory being located in said home network gateway;

code for controlling the processor to receive at said home network interface of said home network gateway a second message, said second message including a second source identifier identifying the source of said second message and further including a different destination address than a destination address included in said first video on demand service request message; and code for controlling the processor to determine based on whether said first source identifier stored in said memory matches said second source identifier included in the second received message whether to provide the requested video on demand service to said sender of said second device.

* * * * *